US012783847B2

(12) United States Patent
Suzuki et al.

(10) Patent No.: US 12,783,847 B2
(45) Date of Patent: Nov. 3, 2026

(54) INFORMATION PROCESSING DEVICE, INFORMATION PROCESSING METHOD, AND INFORMATION PROCESSING PROGRAM FOR GENERATING BASIS INFORMATION INDICATING A BASIS FOR AN OUTPUT OF A MODEL

(71) Applicant: Sony Group Corporation, Tokyo (JP)

(72) Inventors: Kenji Suzuki, Tokyo (JP); Yoshiyuki Kobayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 1043 days.

(21) Appl. No.: 17/768,852

(22) PCT Filed: Nov. 5, 2020

(86) PCT No.: PCT/JP2020/041428
§ 371 (c)(1),
(2) Date: Apr. 14, 2022

(87) PCT Pub. No.: WO2021/090897
PCT Pub. Date: May 14, 2021

(65) Prior Publication Data

US 2023/0045416 A1 Feb. 9, 2023

(30) Foreign Application Priority Data

Nov. 8, 2019 (JP) ................................ 2019-203462

(51) Int. Cl.
*G06N 3/02* (2006.01)
*B60W 60/00* (2020.01)
*G08G 1/16* (2006.01)

(52) U.S. Cl.
CPC .......... *G06N 3/02* (2013.01); *B60W 60/0017* (2020.02); *G08G 1/166* (2013.01)

(58) Field of Classification Search
CPC ........ G06N 3/02; G06N 3/0464; G08G 1/166; B60W 60/0017; G06V 20/58
See application file for complete search history.

(56) References Cited

U.S. PATENT DOCUMENTS

2016/0054452 A1 2/2016 Cosatto
2017/0046613 A1 2/2017 Paluri
(Continued)

FOREIGN PATENT DOCUMENTS

CN 106292705 A 1/2017
CN 108292368 A 7/2018
(Continued)

OTHER PUBLICATIONS

Llorca, David Fernández, et al. "Autonomous pedestrian collision avoidance using a fuzzy steering controller." IEEE transactions on intelligent transportation systems 12.2 (2011): 390-401. (Year: 2011).*

(Continued)

*Primary Examiner* — Andrew L Tank
(74) *Attorney, Agent, or Firm* — XSENSUS LLP

(57) ABSTRACT

An information processing device according to the present disclosure includes: an acquisition unit that acquires a model having a structure of a neural network and input information input to the model; and a generation unit that generates basis information indicating a basis for an output of the model after the input information is input to the model based on state information indicating a state of the model after the input of the input information to the model.

20 Claims, 13 Drawing Sheets

(56) References Cited

U.S. PATENT DOCUMENTS

| | | | | |
|---|---|---|---|---|
| 2018/0017799 | A1 | 1/2018 | Ahmad | |
| 2018/0350459 | A1 | 12/2018 | Yang | |
| 2019/0019087 | A1* | 1/2019 | Fukui | G06V 20/593 |
| 2019/0071101 | A1* | 3/2019 | Emura | G05D 1/0088 |
| 2019/0220969 | A1 | 7/2019 | Miki | |
| 2019/0228305 | A1* | 7/2019 | Lovison | G06V 20/58 |
| 2019/0316913 | A1* | 10/2019 | Golov | G01C 21/30 |
| 2021/0026359 | A1* | 1/2021 | MacGregor | B60W 60/00186 |
| 2021/0035310 | A1* | 2/2021 | Choi | G06T 7/251 |
| 2021/0048818 | A1* | 2/2021 | Funke | G05D 1/617 |
| 2021/0097382 | A1* | 4/2021 | Mathews | G06N 3/045 |
| 2021/0103744 | A1* | 4/2021 | Gao | G06N 3/08 |
| 2021/0122364 | A1* | 4/2021 | Lee | G06F 18/2413 |
| 2021/0331677 | A1* | 10/2021 | Kim | B60W 40/10 |
| 2022/0161818 | A1* | 5/2022 | Solmaz | G08G 1/096725 |

FOREIGN PATENT DOCUMENTS

| | | | |
|---|---|---|---|
| CN | 110383290 | A | 10/2019 |
| CN | 110414631 | A | 11/2019 |
| DE | 102017204404 | B3 * | 6/2018 |
| JP | 2018097766 | A | 6/2018 |
| JP | 2018-154140 | A | 10/2018 |
| JP | 2019082883 | A | 5/2019 |
| JP | 2019-109675 | A | 7/2019 |
| JP | 2019119248 | A | 7/2019 |
| JP | 2019119262 | A | 7/2019 |
| JP | 2019124539 | A | 7/2019 |
| WO | WO-2016067574 | A1 | 5/2016 |
| WO | 2019/087561 | A1 | 5/2019 |

OTHER PUBLICATIONS

Chi, Lu, and Yadong Mu. "Deep steering: Learning end-to-end driving model from spatial and temporal visual cues." arXiv preprint arXiv:1708.03798 (2017). (Year: 2017).*

Olabiyi, Oluwatobi, et al. "Driver action prediction using deep (bidirectional) recurrent neural network." arXiv preprint arXiv:1706.02257 (2017). (Year: 2017).*

Petsiuk, Vitali, Abir Das, and Kate Saenko. "Rise: Randomized input sampling for explanation of black-box models." arXiv preprint arXiv:1806.07421 (2018). (Year: 2018).*

Fukui, Hiroshi, et al. "Attention Branch Network: Learning of Attention Mechanism for Visual Explanation." arXiv preprint arXiv:1812.10025 (2018). (Year: 2018).*

Heylen, Jonas, et al. "From pixels to actions: Learning to drive a car with deep neural networks." 2018 IEEE Winter Conference on Applications of Computer Vision (WACV). IEEE, 2018. (Year: 2018).*

Lazaridis, Lazaros, Anastasios Dimou, and Petros Daras. "Abnormal behavior detection in crowded scenes using density heatmaps and optical flow." 2018 26th European Signal Processing Conference (EUSIPCO). IEEE, 2018. (Year: 2018).*

Rehder, Eike, et al. "Pedestrian prediction by planning using deep neural networks." 2018 IEEE International Conference on Robotics and Automation (ICRA). IEEE, 2018. (Year: 2018).*

Sauer, Axel, Nikolay Savinov, and Andreas Geiger. "Conditional Affordance Learning for Driving in Urban Environments." arXiv preprint arXiv:1806.06498 (2018). (Year: 2018).*

Mori, Keisuke, et al. "Visual explanation by attention branch network for end-to-end learning-based self-driving." 2019 IEEE intelligent vehicles symposium (IV). IEEE, 2019. (Year: 2019).*

Hartley, Thomas, et al. "Gradient weighted superpixels for interpretability in cnns." arXiv preprint arXiv:1908.08997 (2019). (Year: 2019).*

Jiang, Haobin, Jie Zhou, and Xinchen Zhou. "Implementation of human-like driver model based on recurrent neural networks." IEEE Access 7 (2019): 98094-98106. (Year: 2019).*

Jin, Weina, et al. "Bridging ai developers and end users: An end-user-centred explainable ai taxonomy and visual vocabularies." Proceedings of the IEEE Visualization, Vancouver, BC, Canada 20 (2019): 25. (Year: 2019).*

Fong, Ruth, Mandela Patrick, and Andrea Vedaldi. "Understanding deep networks via extremal perturbations and smooth masks." Proceedings of the IEEE/CVF international conference on computer vision. 2019. (Year: 2019).*

Gilpin, Leilani H., et al. "Explaining explanations: An overview of interpretability of machine learning." 2018 IEEE 5th International Conference on data science and advanced analytics (DSAA). IEEE, 2018. (Year: 2018).*

Alvarez Melis, David, and Tommi Jaakkola. "Towards robust interpretability with self-explaining neural networks." Advances in neural information processing systems 31 (2018). (Year: 2018).*

Navarro, A., et al. "Using Reinforcement Learning and Simulation to Develop Autonomous Vehicle Control Strategies." SAE Technical Paper (2020): 01-0737. (Year: 2020).*

Glomsrud, Jon Arne, et al. "Trustworthy versus explainable AI in autonomous vessels." Proceedings of the International Seminar on Safety and Security of Autonomous Vessels (ISSAV) and European Stamp Workshop and Conference (ESWC). vol. 37. 2019. (Year: 2019).*

International Search Report and Written Opinion mailed on Dec. 15, 2020, received for PCT Application PCT/JP2020/041428, Filed on Nov. 5, 2020, 11 pages including English Translation.

Kin et al. "Interpretable Learning for Self-Driving Cars by Visualizing Causal Attention", Computer Vision Foundation, 2017, pp. 2942-2950.

Rieger et al., "Aggregating explainability methods for neural networks stabilizes explanations", arXiv:1903.00519v1, Mar. 1, 2019, 10 pages.

Selvaraju et al., "Grad-CAM: Visual Explanations from Deep Networks via Gradient-based Localization", Computer Vision Foundation, 2016, pp. 618-624.

Mori et al., "Visual Explanation by Attention Branch Network for End-to-end Learning-based Self-Driving", IEEE Intelligent Vehicles Symposium (IV), Jun. 9-12, 2019, pp. 1577-1582.

Aditya Chattopadhyay et al: "Grad-CAM++: Improved Visual Explanations for Deep Convolutional Networks", Nov. 9, 2018 (Nov. 9, 2018), XP055737561.

Nowak Tomasz et al: "How to Improve Object Detection in a Driver Assistance System Applying Explainable Deep Learning".2019 IEEE Intelligent Vehicles Symposium (IV), IEEE, Jun. 9, 2019 (Jun. 9, 2019), pp. 226-231, XP033606147,DOI: 10.1109/IVS.2019.8814134 [retrieved on Aug. 26, 2019].

Tianfu Wu et al: "Towards Interpretable R-CNN by Unfolding Latent Structures",arxiv.org, Cornell University Library, 201 Olin Library Cornell University Ithaca, NY 14853, Nov. 14, 2017 (Nov. 14, 2017), XP081288392.

Kim, Jinkyu, et al., "Interpretable Learning for Self-Driving Cars by Visualizing Causal Attention," Proceedings of the IEEE International Conference on Computer Vision, IEEE, 2017, pp. 2942-2950, doi:10.1109/ICCV.2017.320.

* cited by examiner

FIG.4

121

| MODEL ID | USE | MODEL DATA | ... |
|---|---|---|---|
| M1 | IMAGE RECOGNITION | MDT1 | ... |
| M2 | PREDICTION | MDT2 | ... |
| M3 | ACTION PLANNING | MDT3 | ... |
| ... | ... | ... | ... |

FIG.5

122

| LOG ID | INPUT INFORMATION | BASIS INFORMATION | ... |
|---|---|---|---|
| LG1 | IND1 | RSD1 | ... |
| LG2 | IND2 | RSD2 | ... |
| LG3 | IND3 | RSD3 | ... |
| ... | ... | ... | ... |

INFORMATION PROCESSING DEVICE, INFORMATION PROCESSING METHOD, AND INFORMATION PROCESSING PROGRAM FOR GENERATING BASIS INFORMATION INDICATING A BASIS FOR AN OUTPUT OF A MODEL

CROSS-REFERENCE TO RELATED APPLICATIONS

The present application is based on PCT filing PCT/JP2020/041428, filed Nov. 5, 2020, which claims priority to Japanese Application No. 2019-203462, filed Nov. 8, 2019, the entire contents of each are incorporated herein by reference.

FIELD

The present disclosure relates to an information processing device, an information processing method, and an information processing program.

BACKGROUND

Various systems have been provided in which a machine (computer) assists a human action, and the computer itself performs a determination and operates, such as automatic driving (see, for example, Patent Literatures 1 and 2). In addition, information processing using machine learning has been utilized in various technical fields, and techniques for learning a model, such as a neural network, have been provided. For example, such a learned model is used in the systems, such as the automatic driving, as described above.

CITATION LIST

Patent Literature

Patent Literature 1: JP 2018-154140 A
Patent Literature 2: JP 2019-109675 A

SUMMARY

Technical Problem

According to the related art (for example, Patent Literature 1), a technique is proposed in which a behavior that needs to be taken extremely, which has been registered in advance by a driver, is activated when an emergency signal is received. In addition, according to the related art (for example, Patent Literature 2), a technique is proposed in which pieces of driving action data are aggregated and managed and stored in association with a road network in order to assist automatic driving. In this manner, the techniques in which a computer performs an operation extremely are provided in the related art, but there is no consideration on how the computer performs a determination.

Meanwhile, it is desired to allow a human to grasp a determination basis of how the system in which the computer (information processing device) performs a determination such as the automatic driving performs a determination. In particular, a model having a structure of a neural network has a problem that it is difficult for a human to grasp a determination basis due to complexity of the structure. This problem is not limited to the automatic driving, and is a problem common to fields using the model having the structure of the neural network. In addition, showing a basis for such processing executed by the computer is a problem common to the entire processing performed by the computer without being limited to the case of having the structure of the neural network. Therefore, it is desired to enable elucidation of the basis for the processing performed by the information processing device.

Therefore, the present disclosure proposes an information processing device, an information processing method, and an information processing program capable of enabling elucidation of a basis for processing performed by the information processing device.

Solution to Problem

According to the present disclosure, an information processing device includes an acquisition unit that acquires a model having a structure of a neural network and input information input to the model; and a generation unit that generates basis information indicating a basis for an output of the model after the input information is input to the model based on state information indicating a state of the model after the input of the input information to the model.

BRIEF DESCRIPTION OF DRAWINGS

FIG. 4 is a diagram illustrating an example of a model information storage unit according to the embodiment of the present disclosure.

FIG. 5 is a diagram illustrating an example of a leg information storage unit according to the embodiment of the present disclosure.

DESCRIPTION OF EMBODIMENTS

Hereinafter, embodiments of the present disclosure will be described in detail with reference to the drawings. Note that an information processing device, an information processing method, and an information processing program according to the present application are not limited by the embodiments. In addition, the same portions are denoted by the same reference signs in each of the following embodiments, and a repetitive description thereof will be omitted.

The present disclosure will be described in the following item order.

1. Embodiment
1-1. Overview of Information Processing According to Embodiment of Present Disclosure
1-1-1. Problems, Effects, Etc. in Automatic Driving
1-1-2. Other Visualization Examples
1-1-2-1. Visualization Analysis Technique Using Complex Algorithm
1-1-3. Other Application Examples
1-1-4. AI Ethics
1-2. Configuration of moving body device according to Embodiment
1-2-1. Model Examples
1-3. Procedure of Information Processing According to Embodiment
1-4. Another Example of Information Processing
1-5. Conceptual Diagram of Configuration of In-Vehicle System
2. Other Embodiments
2-1. Other Configuration Examples
2-2. Configuration of Moving Body
2-3. Others
3. Effects According to Present Disclosure
4. Hardware Configuration

1. Embodiment

Figure 1:
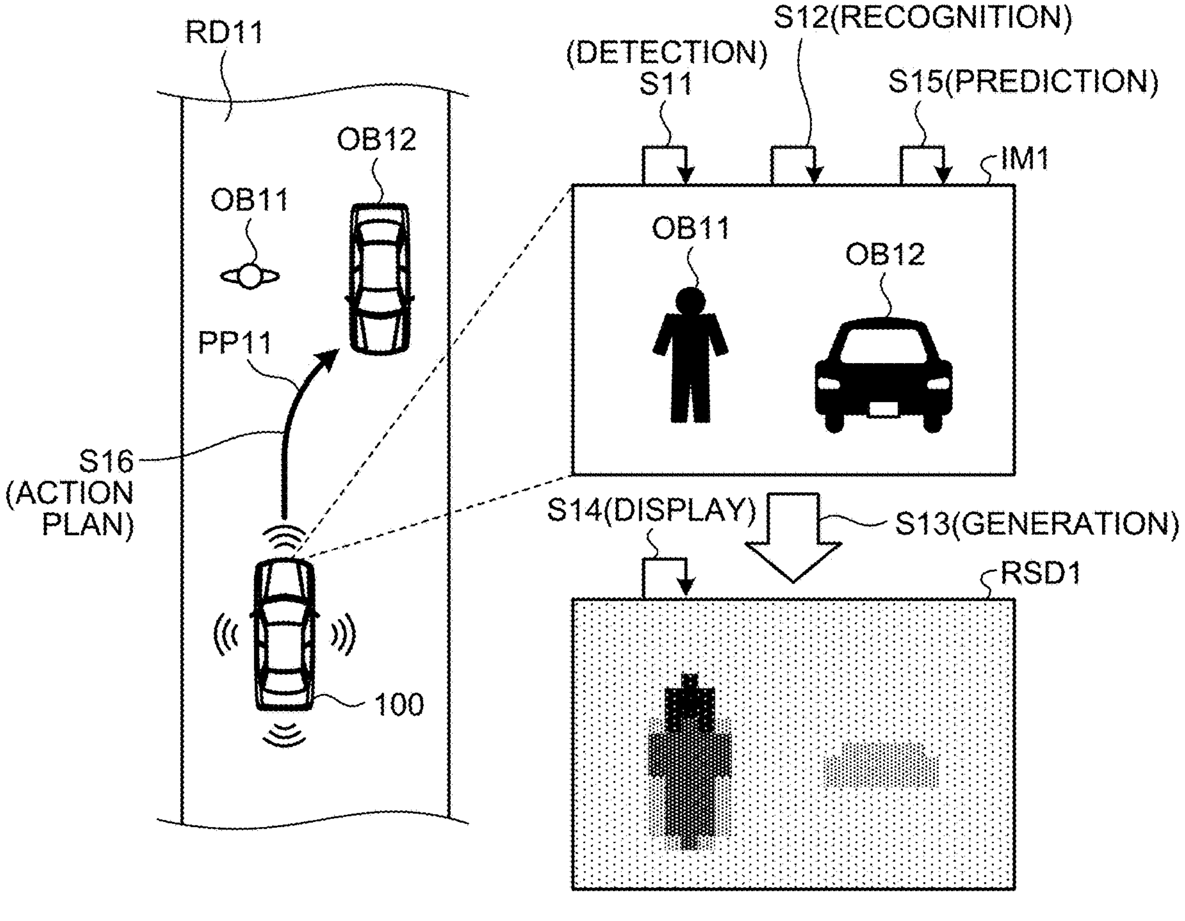
FIG. 1 is a diagram illustrating an example of information processing according to an embodiment of the present disclosure.

1-1. Overview of Information Processing According to Embodiment of Present Disclosure FIG. 1 is a diagram illustrating an example of information processing according to an embodiment of the present disclosure. The information processing according to the embodiment of the present disclosure is implemented by a moving body device 100 illustrated in FIG. 1.

The moving body device 100 is an information processing device that executes the information processing according to the embodiment. The moving body device 100 is a moving body that travels by automatic driving. For example, the moving body device 100 is a moving body that automatically travels by appropriately using various conventional techniques related to the automatic driving. The moving body device 100 nay be a vehicle automated at any level of Levels 0 to 5 defined in Society of Automotive Engineers (SAE). The example of FIG. 1 illustrates a case where the moving body device 100 is a vehicle automated at Level 3. That is, the example of FIG. 1 illustrates a case where the moving body device 100 is a vehicle in which the moving body device 100 itself autonomously controls traveling and which can be operated by a user riding on the moving body device 100 as necessary. Note that the moving body device 100 may be a highly automated vehicle of Level 4 or higher that does not require the ride of the driver, or may be of Level 2 or lower.

In addition, in the example of FIG. 1, the moving body device 100 that is a vehicle that travels by the automatic driving, a so-called automobile, is illustrated as an example of a moving body, but the moving body may be any object as long as the object autonomously travels. For example, the moving body is not limited to four wheels, and may be various forms of moving bodies such as a moving body having wheels other than four wheels, such as two wheels and three wheels, a moving body having no wheel, a drone, and a robot. In addition, in the example of FIG. 1, the moving body in a form on which a person rides is illustrated as an example, but the moving body may be in a form of autonomously moving in an unmanned manner without the ride of the person, but details of this point will be described later.

Figure 2:
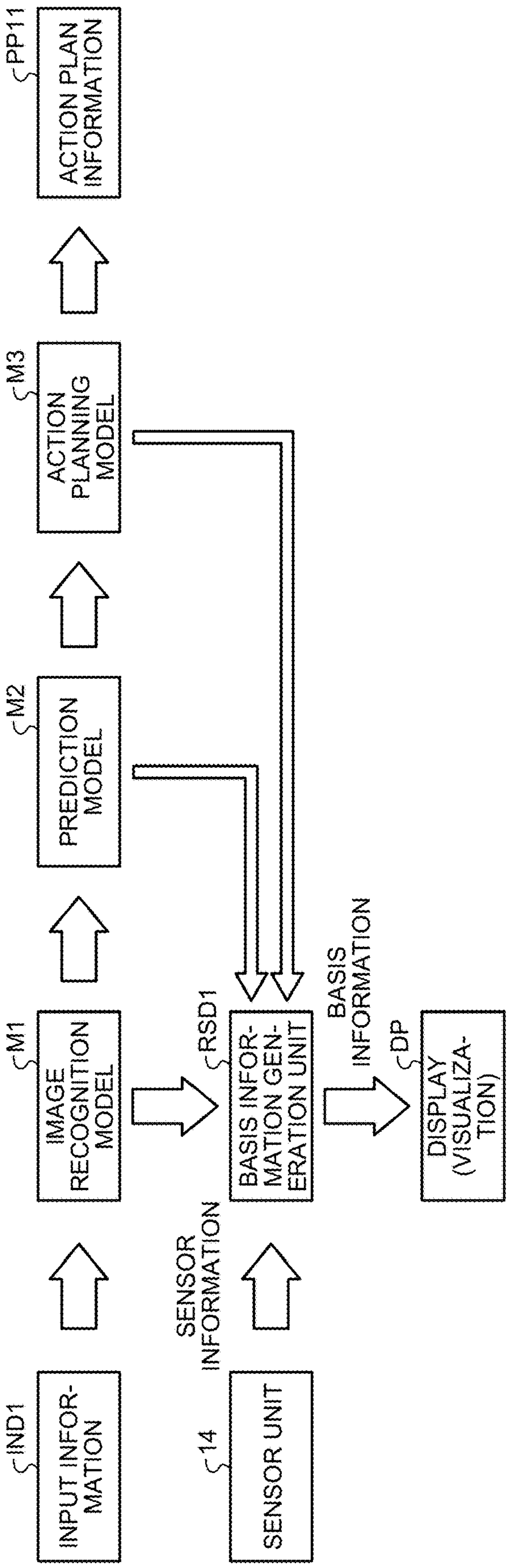
FIG. 2 is a diagram illustrating an example of a flow of the information processing according to the embodiment.

Hereinafter, details of the processing illustrated in FIG. 1 will be described with reference to FIG. 2. FIG. 2 is a diagram illustrating an example of a flow of the information processing according to the embodiment. The example illustrated in FIG. 1 illustrates a case where a user (hereinafter, also referred to as a "user U") rides on the moving body device 100 and the moving body device 100 is traveling on a road RD11. Specifically, the example illustrated in FIG. 1 illustrates a case where a direction from the moving body device 100 toward objects OB11 and OB12, which will be described later, is the front of the moving body device 100 and the moving body device 100 is traveling forward. Note that a side portion of the road RD11 is a region, such as a wall surface, into which the moving body device 100 is not allowed to enter. First, the moving body device 100 performs detection by a sensor unit 14 (see FIG. 3) (Step S11). The moving body device 100 detects image information (also simply referred to as an "image") by an image sensor 141 (see FIG. 3). In the example of FIG. 1, the moving body device 100 detects (captures) an image IM1 by the image sensor 141.

Then, the moving body device 100 performs a recognition process (Step S12). The moving body device 100 performs the recognition process based on the image IM1 captured by the image sensor 141. The moving body device 100 performs the process of recognizing an object or the like included in the image IM1. The moving body device 100 performs the recognition process using a model M1 for image recognition as illustrated in FIG. 2. For example, the moving body device 100 inputs the image IM1 to the model M1 as input information IND1, thereby causing the model M1 to output a recognition result. The model M1 outputs information corresponding to an input of a model M2 as the recognition result. For example, the model M1 outputs information indicating a type (class) of an object included in an image and information indicating a position (region) thereof in response to the input of the image. Note that the above is an example, and the model M1 may output any information as long as the information corresponds to the input of the model M2, and may output information, for example, indicating a situation of a captured image such as "a signal is red".

Figure 6:
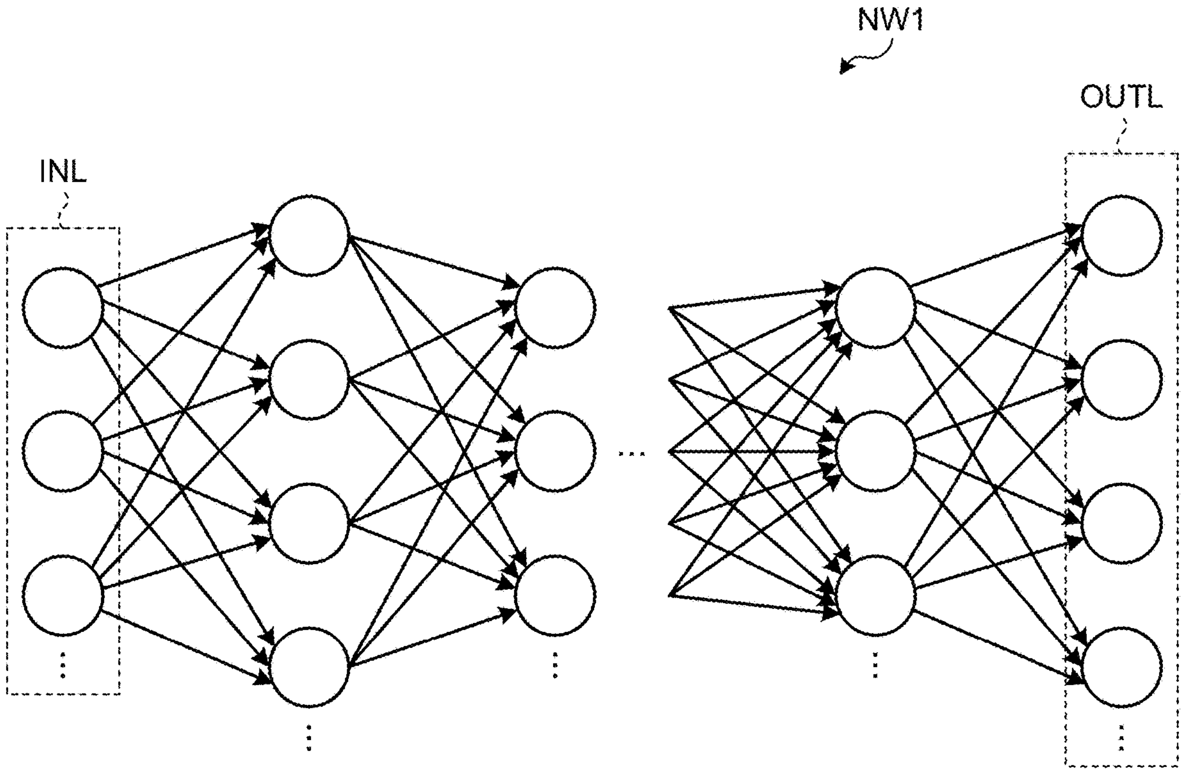
FIG. 6 is a diagram illustrating an example of a model according to the embodiment of the present disclosure.

Here, the model M1 is a multilayer neural network, and has a structure such as a deep neural network of four or more layers, a so-called deep neural network (deep learning), as illustrated in FIG. 6, for example. In addition, the model M1 is a model that includes a convolutional neural network (CNN) and outputs information indicating an object included in an image and a position thereof in response to the input of the image. The model M1 is a model having a structure of a neural network. For example, the model M1 is a model having a structure of a CNN that has a so-called convolution layer.

In the example of FIG. 1, the moving body device 100 inputs the image IM1 to the model M1, thereby causing the model M1 to output information indicating that the object OB11 of a type "person" is present at a position (region) on the left side of the image IM1. In addition, the moving body device 100 inputs the image IM1 to the model M1, thereby causing the model M1 to output information indicating that the object OB12 of a type "vehicle" is present at a position (region) on the right side of the image IM1. Then, the moving body device 100 performs processes of Steps S13 to S16. Note that Steps S13 to S16 are attached to the respective processes in the example of FIG. 1 for convenience of description, but it does not indicate that Step S15 is performed after Step S14. For example, the processes of Steps S13 and S14 and the processes of Steps S15 and S16 are performed in parallel.

First, the processes of Steps S13 and S14 will be described. The moving body device 100 performs a generation process (Step S13). The moving body device 100 generates basis information indicating a basis for the output of the model after the input information is input to the model based on state information indicating a state of the model M1 after the input of the input information to the model M1. The moving body device 100 generates the basis information indicating the basis for the output of the model M1 after the image IM1 is input to the model M1 based on the state information indicating the state of the model M1 after the input of the image IM1 to the model M1.

In the example of FIG. 1, the moving body device 100 generates the basis information indicating the basis for the output of the model M1 after the input of the image IM1 by gradient-weighted class activation mapping (Grad-CAM). For example, the moving body device 100 generates the basis information indicating the basis for the output of the model M1 after the input of the image IM1 by processing related to Grad-CAM as disclosed in the following literature. The moving body device 100 generates the basis information indicating the basis for the output of the model M1 after the input of the image IM1 using the technique of Grad-CAM, which is a visualization technique applicable to all networks including CNN. For example, the moving body device 100 can visualize a portion affecting each class by calculating a weight of each channel from the final layer of the CNN and multiplying the weight. In this manner, the moving body device 100 can visualize any portion of an image which has been focused to perform a determination in the neural network including the CNN.

Grad-CAM: Visual Explanations from Deep Networks via Gradient-Based Localization <https://arxiv.org/abs/1610.02391>

Note that, the moving body device 100 generates the basis information by the Grad-CAM technique (above-described patent literature) although a description regarding the Grad-CAM technique is appropriately omitted. For example, the moving body device 100 designates a target type (class) and generates information (an image) corresponding to the designated class. For example, the moving body device 100 generates the information (image) with the designated class as the target by various types of processing, such as back-propagation, using the Grad-CAM technique.

In the example of FIG. 1, the moving body device 100 designates a class of the type "person" and generates an image related to basis information by a basis information generation unit RSD1 (see FIG. 2) corresponding to the type "person". For example, the basis information generation unit RSD1 generates an image indicating a range (region) gazed for recognition (classification) of the type "person" in a form of a so-called heat map (color map). FIG. 1 illustrates an expression in black and white, and thus, a region with a darker hatching indicates a region that is gazed for recognition (classification) of the type "person". In this manner, in the example of FIG. 1, the basis information generation unit RSD1 generates, as basis information RINF1, an image indicating that a position of the object OB11, which is the person, on the image IM1 is gazed the most and the object OB11 which is the person is recognized. In addition, it is assumed that the moving body device 100 also appropriately recognizes the object OB12 which is the vehicle in the example of FIG. 1.

Then, the moving body device 100 performs a display process (Step S14). The moving body device 100 displays the basis information RINF1 generated by the basis information generation unit RSD1 on a display unit 11 (see FIG. 3). As illustrated in FIG. 2, the moving body device 100 implements visualization by a display DP related to the basis information generated by the basis information generation unit RSD1.

As described above, the moving body device 100 enables elucidation of the basis for the output of the model having the structure of the neural network. In this manner, the moving body device 100 enables elucidation of the basis for the processing performed by the moving body device 100 that is the information processing device. As a result, the user U riding on the moving body device 100 can grasp the basis information regarding the model M1 to a model M3 in real time. For example, in a case where there is a discrepancy between an actual state and the basis information of the basis information generation unit RSD1, the user U riding on the moving body device 100 stops the automatic driving, and the user U himself/herself can operate the moving body device 100. Since the object OB11 which is the person is appropriately recognized as illustrated in the basis information generation unit RSD1 in the example of FIG. 1, the user U may maintain an automatic driving state of the moving body device 100.

In addition, the moving body device 100 stores the basis information generated by the basis information generation unit RSD1 in a storage unit 12 (see FIG. 3) as a history in association with the image IM1 which is the input information IND1 that serves as the base of the basis information. For example, the moving body device 100 stores the input information IND1 and the basis information, such as the basis information RINF1, in a log information storage unit 122 (see FIG. 3) in association with each other. As a result, it is possible to verify any input for which the moving body device 100 has performed a determination to perform the subsequent operation.

Hereinafter, the processes of Steps S15 and S16 will be described. Note that the process of Step S15 is performed immediately after the process of Step S12 is completed.

The moving body device 100 performs a prediction process based on the recognition result of the recognition process (Step S15). The moving body device 100 performs the prediction process based on the output of the model M1. The moving body device 100 performs the process of predicting an action (motion mode) such as movement of an object included in the image IM1. The moving body device 100 performs the prediction process using the model M2 for prediction as illustrated in FIG. 2. For example, the moving body device 100 inputs information (recognition result information) output from the model M1 to the model M2, thereby causing the model M2 to output a prediction result. For example, the model M2 outputs information indicating a movement direction and a speed of an object included in the recognition result information in response to the input of the recognition result information. For example, the model M2 is a multilayer neural network, and has a structure such as a deep neural network of four or more layers, a so-called deep neural network (deep learning), as illustrated in FIG. 6, for example. Note that the model M2 may perform the prediction process using various types of information such as sensor information as the input without being limited to the information output from the model M1.

The moving body device 100 predicts a motion mode of the object OB11 which is the person. The moving body device 100 predicts a movement direction and a speed of the object OB11. In the example of FIG. 1, the moving body device 100 predicts that the object OB11 is moving toward the moving body device 100. In addition, the moving body device 100 predicts a motion mode of the object OB12 which is the vehicle. The moving body device 100 predicts a movement direction and a speed of the object OB12. In the example of FIG. 1, the moving body device 100 predicts that the object OB12 is moving toward the moving body device 100.

The moving body device 100 performs a process of determining an action plan based on the prediction result of the prediction process (Step S16). The moving body device 100 performs a process of generating the action plan based on an output of the model M2. The moving body device 100 determines the action plan based on the predicted motion modes of the object OB11 and the object OB12. The moving body device 100 performs the process of determining the action plan using the model M3 for action planning as illustrated in FIG. 2. For example, the moving body device 100 inputs information (prediction result information) output from the model M2 to the model M3, thereby causing the model M3 to output the action plan. For example, the model M3 outputs information indicating the action plan of the moving body device 100 in response to the input of the prediction result information. For example, the model M3 is a multilayer neural network, and has a structure such as a deep neural network of four or more layers, a so-called deep neural network (deep learning), as illustrated in FIG. 6, for example. Note that the model M3 may perform the process of generating the action plan using various types of information such as sensor information as the input without being limited to the information output from the model M2. In this manner, the moving body device 100 is the information processing device that performs actions using the models M1 to M3 which are models (machine learning models) learned by machine learning. Note that the actions referred to herein include various actions such as information processing executed by the information processing device and actions of a robot, a moving body, and the like.

In the example of FIG. 1, the moving body device 100 determines the action plan so as to avoid the object OB11 since the objects OB11 and OB12 are located in a proceeding direction of the own device and coming toward the moving body device 100, and it is difficult to avoid both the objects OB11 and OB12. Specifically, the moving body device 100 plans a route PP11 to proceed to the right side of the proceeding direction in order to avoid a collision with the object OB11 located on the left side of the proceeding direction. The moving body device 100 generates action plan information indicating the route PP11. Then, the moving body device 100 controls the automatic driving based on the action plan information indicating the route PP11. For example, the moving body device 100 stores the input information IND1 in the log information storage unit 122 (see FIG. 3) in association with the route PP11 and actual travel information of the moving body device 100 based on the route PP11. As a result, it is possible to verify which input the moving body device 100 has received and how the moving body device 100 has made a plan and traveled.

As described above, the moving body device 100 detects (recognizes) the object OB11 which is a pedestrian using the image IM1 detected by the image sensor 141, and displays the basis information generated in the basis information generation unit RSD1 that is the heat map on which the object OB11 is highlighted on the display unit 11 in the example of FIG. 1. In this manner, in the example of FIG. 1, the pedestrian is detected from the sensor in the automatic driving, and the pedestrian is highlighted and displayed with the heat map by a visualization display device (for example, the display unit 11 or the like).

For example, in the example of FIG. 1, the moving body device 100 takes a course toward the object OB12 that is the vehicle and approaches the object OB12 in order to avoid the object OB11 which is the pedestrian. At this time, the moving body device 100 displays the basis information that is the heat map on which the object OB11 as the pedestrian is highlighted in real time. As a result, an occupant of the moving body device 100 can recognize that the moving body device 100 is taking the course toward the vehicle in order to avoid the person. In this manner, the occupant of the moving body device 100 can understand that the moving body device 100 traveling by the automatic driving tries to avoid the pedestrian. Therefore, the occupant of the moving body device 100 can also avoid an accident with an oncoming car by stopping the automatic driving to switch to emergency manual driving and operating a steering wheel unit, a brake unit, or the like by himself/herself.

In addition, it is assumed that the moving body device 100 collides with the object OB12 which is the oncoming car since the automatic driving has determined to proceed in the right direction in order to avoid the pedestrian which is the object OB11 in the example of FIG. 1. Even in such a case, the moving body device 100 can provide information indicating a reason (basis) of the collision with the object OB12 is to avoid the object OB11 which is the pedestrian since the basis information generated in the basis information generation unit RSD1, which is the heat map on which the object OB11 as the pedestrian is highlighted, is stored in the storage unit 12. Further, it is also possible to provide various types of information recorded by the sensor unit 14, for example, sensor information such as a speed, an acceleration, an ambient outside temperature, a road surface situation (wetting by rain, freezing, or the like) of the moving body device 100, and a physical condition of a driver in a company (presence or absence of consciousness, a blood pressure, a body temperature, a heart rate, a posture, or the like). For example, the moving body device 100 may output the sensor information such as the speed, the acceleration, the ambient outside temperature, the road surface situation, and the physical condition of the driver in the company detected by the sensor unit 14 as the information indicating the basis of the action of the moving body device 100. That is, the moving body device 100 can prove, from log data, "to avoid the pedestrian" as the elucidation of the collision accident with the oncoming car in comprehensive consideration of these pieces of information.

Here, FIG. 2 will be described in detail. The moving body device 100 includes the basis information generation unit RSD1 including a plurality of basis generation algorithms for generating basis information of an action. For example, the basis information generation unit RSD1 corresponds to a generation unit 136 in FIG. 3, the storage unit 12 storing the plurality of basis generation algorithms, or the like. In this case, specifically, the storage unit 12 stores a plurality of computer programs (also simply referred to as "programs") in which the plurality of basis generation algorithms are mounted, respectively. In this manner, a program in which an algorithm is mounted may be referred to as the algorithm. In addition, the plurality of basis generation algorithms described herein include algorithms using techniques such as Grad-CAM, local interpretable model-agnostic explanations (LIME), which will be described later, and testing with concept activation vectors (TCAV). For example, the plurality of basis generation algorithms include three algorithms, that is, an algorithm based on the Grad-CAM technique, an algorithm based on the LIME technique, and an algorithm based on the TCAV technique. Note that the basis generation algorithm may be an algorithm using various techniques without being limited to Grad-CAM, LIME, and TCAV.

The moving body device 100 generates basis information of an action using one basis generation algorithm among the plurality of basis generation algorithms. The moving body device 100 selects one basis generation algorithm among the plurality of basis generation algorithms, and generates basis information of an action using the selected basis generation algorithm. In the case of processing requiring the real-time property, the moving body device 100 selects an algorithm based on the Grad-CAM technique among the plurality of basis generation algorithms, and generates basis information of an action using the algorithm based on the selected Grad-CAM technique. In addition, in a case where it is desired to obtain a locally approximated basis, the moving body device 100 selects an algorithm based on the LIME technique, and generates basis information of an action using the algorithm based on the selected LIME technique. Furthermore, in a case where it is desired to take into account the directionality of activating a concept, the moving body device 100 selects an algorithm based on the TCAV technique, and generates basis information of an action using the algorithm based on the selected TCAV technique.

The moving body device 100 outputs information indicating a basis of an action based on the basis information generated based on one or a plurality of basis generation algorithms and/or the sensor information. The moving body device 100 outputs first basis information generated by the algorithm based on the Grad-CAM technique, second basis information generated by the algorithm based on the LIME technique, and third basis information generated by the algorithm based on the TCAV technique as the information indicating the basis of the action. When selecting one basis generation algorithm, the moving body device 100 outputs basis information of an action generated using the selected basis generation algorithm. In the case of the processing requiring the real-time property, the moving body device 100 selects the algorithm based on the Grad-CAM technique, and outputs the basis information of the action generated using the algorithm based on the selected Grad-CAM technique.

For example, the moving body device 100 has a stop function. The moving body device 100 detects an abnormality and executes emergency switching from the automatic driving to the manual driving. The concept of stopping AI, configured to the automatic driving, is very important. For example, the AI itself detects an abnormality and requests a human (an occupant or the like) to switch from the automatic driving to the manual driving in the moving body device 100. Then, the moving body device 100 can prevent an accident in advance by specifically visualizing what is a problem to make the human interested in a portion to be careful. The above moving body device 100 corresponds to a system in which an emergency stop button is pressed by the AI itself and the AI elucidates what is the problem by visualization.

For example, traffic circumstances and rules vary depending on countries. Therefore, the moving body device 100 uses a model (neural network) learned using data of an area used (operated) by the moving body device 100 as a learning data set. For example, situations differ between Japan and the United States. Therefore, when the moving body device 100 is made to travel in Japan, a network learned by collecting data in Japan is used as the moving body device 100. As a result, the moving body device 100 can implement the automatic driving that appropriately corresponds to situations of left-hand traffic and narrow roads in Japan. For example, if data sets of different areas are used, a network is created based on undesirable data such as learning data of right-hand traffic and data with different traffic rules for right turn and left turn. Meanwhile, it is possible to use an appropriate model corresponding to a use situation of the moving body device 100 by using a model learned using a data set optimal for an area depending on the area where the moving body device 100 is used. Then, it is possible to describe that learning data used for learning of the model used by the moving body device 100 is data corresponding to an appropriate environment.

As described above, the moving body device 100 can implement safer driving by adding a sound, an odor, or the like to a determination basis without being limited to the image. For example, if a sound of a horn is heard from the right side, a human pays attention (has an interest) to the sound. Therefore, when detecting a sound such as an abnormal sound in conjunction with a sound sensor that detects the sound, for example, the moving body device 100 performs imaging (detection by the image sensor) to be focused in the same direction with a generation source of the sound and images the direction, thereby improving accuracy in a specific direction. In addition, the determination is also necessary depending on an odor. For example, if it is noticed that there is a strange odor from a car, it is possible to detect a failure of the car early. For example, even in the moving body device 100, it is advantageous that an odor sensor also performs feedback to a control system of the automatic driving to notify a human of an abnormality. In this manner, an abnormality detection system by deep learning can be configured to perform the determination depending on the sound or odor in the moving body device 100. That is, the determination can be performed using not only the image (visual sense) but also the sensor information corresponding to various senses such as a voice (auditory sense) and an odor (olfactory sense), that is, multi-modal information in the moving body device 100. As a result, the moving body device 100 approximates to a vehicle driven by a human and can be driven with security.

For example, Grad-Cam that operates in real time is one means for visualizing a determination basis of deep learning. Grad-Cam expresses the determination basis of the CNN using the heat map, but the means for visualization is not limited thereto. For example, there are various types of other means for interpreting deep learning, and a determination basis differs depending on each means due to different perspectives. For example, LIME designates a certain category and performs a forward calculation on a lot of test images. Grad-Cam designates a certain category and performs a calculation in a completely opposite direction to a backward calculation. As each interpretation, a system in which a plurality of basis generation algorithms are simultaneously or selectively activated is effective in order to more deeply understand a determination basis although the determination basis is obtained as the interpretation in each technique. As a result, an optimal explanation algorithm (basis generation algorithm) is selected according to a situation. Here, techniques for avoiding an accident in advance have been studied day and night. The techniques are still in the middle of progress from the viewpoint of investigating a cause when an accident has occurred. When an accident has occurred, the system that performs analysis from a log using the plurality of basis generation algorithms is useful. Therefore, the moving body device 100 can appropriately elucidate a basis by using the plurality of basis generation algorithms. For example, even in a time-consuming calculation, sufficient time can be ensured in the case of investigating a cause of an accident after the occurrence of the accident.

[1-1-1. Problems, Effects, Etc. in Automatic Driving]

Hereinafter, problems and the like in the automatic driving as illustrated in FIG. 1 will be described. The automatic driving by artificial intelligence has been implemented. However, it is not possible to know a determination basis of the artificial intelligence, and the automatic driving is currently performed by a determination using a black box. In recent years, accidents in the automatic driving have occurred, and artificial intelligence (AI) ethics has become a problem. For example, there is a problem that it is difficult for an occupant (driver) to know a reason why a vehicle traveling by the automatic driving suddenly avoids to the left. However, if the reason (basis) is known, whether it is an erroneous determination performed by artificial intelligence becomes clear, and it is expected that an accident can be prevented in advance by avoiding the occurrence of the accident in advance. Therefore, it is desired to provide a visualized reason (basis) for the determination of the artificial intelligence to the occupant in the automatic driving. In the above-described SAE, for example, Levels 1 and 2 of the automatic driving are defined as driving assistance, and Level 3 is defined as enabling manual driving in an emergency. If the determination basis of the artificial intelligence can be visualized in real time at these levels, useful information can be provided to the driver.

Conventionally, the artificial intelligence has advanced performance, but has been called a black box. For example, deep learning has a structure that mimics human neurons, and a model is formed by optimizing an extremely large number of parameters. Due to its complexity, it has been said that it is impossible to elucidate the artificial intelligence. In recent years, studies on the artificial intelligence that can be elucidated have been actively conducted, and techniques for visualizing a determination basis have attracted attention. Various algorithms have been proposed, but remain in studies at an academic level, and deployment to a practical system has been delayed.

Therefore, the moving body device 100 visualizes a basis determined by the neural network including the deep learning. As a result, the moving body device 100 can provide useful information to the driver of the moving body device 100 by visualizing the basis of the determination by the neural network in real time. In the example of FIG. 1, when the image captured by the image sensor 141 is used as the input, the moving body device 100 can display the basis information generated by the basis information generation unit RSD1 indicating a local portion serving as a determination basis of the model M1, which is the deep learning, in the form of the heat map. The moving body device 100 can visualize the determination in the convolution neural network (CNN) included in the model M1 for solving an image classification problem, and the driver (human) of the moving body device 100 can know the basis of the determination. In addition, the above-described visualization includes a method capable of the real-time operation (also including a method that is not real-time), and thus, can be applied to an automatic driving system such as the moving body device 100, so that the driver of the moving body device 100 can know a reason (basis) for movement of the moving body device 100 in real time. Since the algorithm for visualizing the determination basis of the deep learning is incorporated in the vehicle driving system in this manner, the driver can know the reason for movement of an automatically driving vehicle in real time.

Even if an accident occurs in the automatic driving, what kind of determination is used as the basis of the automatic driving can be elucidated by the deep learning visualization technique with the moving body device 100 as described above. In addition, even if an accident occurs, for example, it is possible to indicate the basis of the operation of the automatic driving vehicle based on the log information stored in the log information storage unit 122 or the like and the sensor information of the sensor unit 14 as necessary with the moving body device 100 as described above. In this manner, if an accident occurs, it is possible to perform the visualization display of the determination basis stored in the log and the elucidation from the sensor information with the moving body device 100 as described above.

In this manner, the moving body device 100 visualizes the determination basis of the deep learning in the automatic driving. As a result, the moving body device 100 can assist the driver, avoid an accident, and investigate a cause of an accident. In addition, the moving body device 100 indicates a point determined by the deep learning in real time by the heat map in analysis of travel image data acquired by a sensor. As a result, the moving body device 100 can avoid an accident by visualizing the determination basis of the deep learning in real time to make a human switch to the manual driving. Note that the moving body device 100 may be stopped while ensuring safety or the like as the system depending on a result of the basis information obtained from the basis determination generation unit RSD1.

[1-1-2. Other Visualization Examples]

Note that the case where the image such as the heat map is generated as the basis information has been illustrated in the example of FIG. 1, but the basis information is not limited to the image, and may be information in various forms such as character information and voice information.

In addition, the moving body device 100 may generate the basis information in the basis information generation unit RSD1 appropriately using various techniques as the method for generating the basis information without being limited to Grad-CAM. For example, the moving body device 100 may generate the basis information using the LIME technique. For example, the moving body device 100 may generate the basis information by processing related to LIME as disclosed in the following document.

"Why Should I Trust You?": Explaining the Predictions of Any Classifier <https://arxiv.org/abs/1602.04938>

Note that, the moving body device 100 generates the basis information by the LIME technique (above-described patent literature) although a description regarding the LIME technique is appropriately omitted. For example, the moving body device 100 generates another model (basis model) that is locally approximate in order to indicate a reason (basis) why the model has performed such a determination. The moving body device 100 generates a locally approximated basis model with a combination of input information and an output result corresponding to the input information as a target. Then, the moving body device 100 generates basis information using the basis model. Further, the moving body device 100 may use a method of calculating (generating) basis information such as "Testing with Concept Activation Vectors" (test in which the directionality of activating a concept is taken into account) called TCAV as disclosed in the following literature.

Interpretability Beyond Feature Attribution: Quantitative Testing with Concept Activation Vectors (TCAV) <https://arxiv.org/pdf/1711.11279.pdf>

For example, the moving body device 100 generates a plurality of pieces of input information obtained by duplicating or changing input information (target input information) serving as a base of an image or the like. Then, the moving body device 100 inputs each of the plurality of pieces of input information to a model (model to be elucidated) as a target for generation of basis information, and outputs a plurality of pieces of output information corresponding to the respective pieces of input information from the model to be elucidated. Then, the moving body device 100 learns the basis model by using a combination (pair) of each of the plurality of pieces of input information and each of the plurality of pieces of corresponding output information as learning data. In this manner, the moving body device 100 generates the basis model that is locally approximate with another interpretable model (such as a linear model) for the target input information.

In this manner, when an output of the model for a certain input is obtained, the moving body device 100 generates the basis model for indicating a basis (local elucidation) of the output.

For example, the moving body device 100 generates an interpretable model such as a linear model as the basis model. The moving body device 100 generates basis information based on information such as each parameter of the basis model such as the linear model. For example, the moving body device 100 generates the basis information indicating that an effect of a feature value having a large weight is large among feature values of the basis model such as the linear model.

As described above, the moving body device 100 generates the basis information based on the basis model learned using the input information and an output result of the model. In this manner, the moving body device 100 may generate the basis information based on state information including the output result of the model after the input information is input to the model.

In addition, in the example of FIG. 1, the moving body device 100 may generate the basis information not only for the model M1 but also for the models M2 and M3. For example, the moving body device 100 may generate basis information for prediction of the model M2 based on a basis model learned using input information and an output result of the model M2. For example, the moving body device 100 may generate basis information for action planning of the model M3 based on a basis model learned using input information and an output result of the model M3. The moving body device 100 may generate the basis information for the model M2 using the LIME technique. The moving body device 100 may generate the basis information indicating the basis of prediction of the model M2, which is the model using the output of the model M1 as the input, using the LIME technique. The moving body device 100 may generate the basis information for the model M3 using the LIME technique. The moving body device 100 may generate the basis information indicating the basis of action planning of the model M3, which is the model using the output of the model M2 as the input, using the LIME technique.

[1-1-2-1. Visualization Analysis Technique Using Complex Algorithm]

Note that the moving body device 100 may implement visualization by combining a plurality of algorithms. In this manner, there is a further advantage by combining a plurality of visualization algorithms to perform analysis. For example, the moving body device 100 may analyze a determination basis from a complex viewpoint by combining a first algorithm that visualizes the determination basis and a second algorithm different from the first algorithm.

For example, the moving body device 100 may combine a plurality of algorithms, such as Grad-Cam as a first algorithm and LIME as a second algorithm, and analyze a determination basis from a complex viewpoint according to a situation or a characteristic. The moving body device 100 may combine Grad-Cam that visualizes a determination basis based on a feature value of deep learning, and LIME that generates a large amount of sample data and visualizes a determination basis from a mask image as a local classification problem. Grad-Cam can visualize a point of interest from a feature value of a convolution layer. In addition, LIME is a visualization technique obtained by performing inference using a large amount of sample data. In this manner, the moving body device 100 can improve the analysis accuracy by combining different visualization technologies. For example, the moving body device 100 may provide a user with first basis information generated by Grad-Cam and second basis information generated by LIME. The moving body device 100 may display the first basis information generated by Grad-Cam and the second basis information generated by LIME.

[1-1-3. Other Application Examples]

Note that the automatic driving illustrated in FIG. 1 is an example, and the present invention may be applied to various technologies without being limited to the automatic driving. For example, the moving body device 100 may be a moving body in another form such as an electric bicycle, a motorcycle, and a drone without being limited to the automobile. In a case where the moving body device 100 is a drone, the image sensor 141 views (images) the omnidirectional region widely, but may perform zoom capturing by cropping for a portion of a target object when recognizing the object.

Furthermore, the present invention may be applied to various technologies such as an entertainment robot, a robot, a cooking robot, a medical robot, and a humanoid. That is, the information processing device that generates basis information may be a device used in technical fields such as the entertainment robot, the robot, the cooking robot, the medical robot, and the humanoid. In the case of the entertainment robot, the information processing device that generates basis information may use the image sensor to generate basis information indicating any point that the entertainment robot has viewed (recognized) to perform an action. In addition, in the case where the medical robot is used as a target, the information processing device that generates basis information may use the image sensor to generate basis information indicating what the medical robot has recognized to perform an action related to surgery. In this case, the information processing device that generates basis information may generate basis information indicating a basis of the action of the medical robot when a medical accident occurs. As a result, it is possible to determine whether the medical accident, generated by the medical robot, is caused by a mistake of the medical robot.

Figure 12:
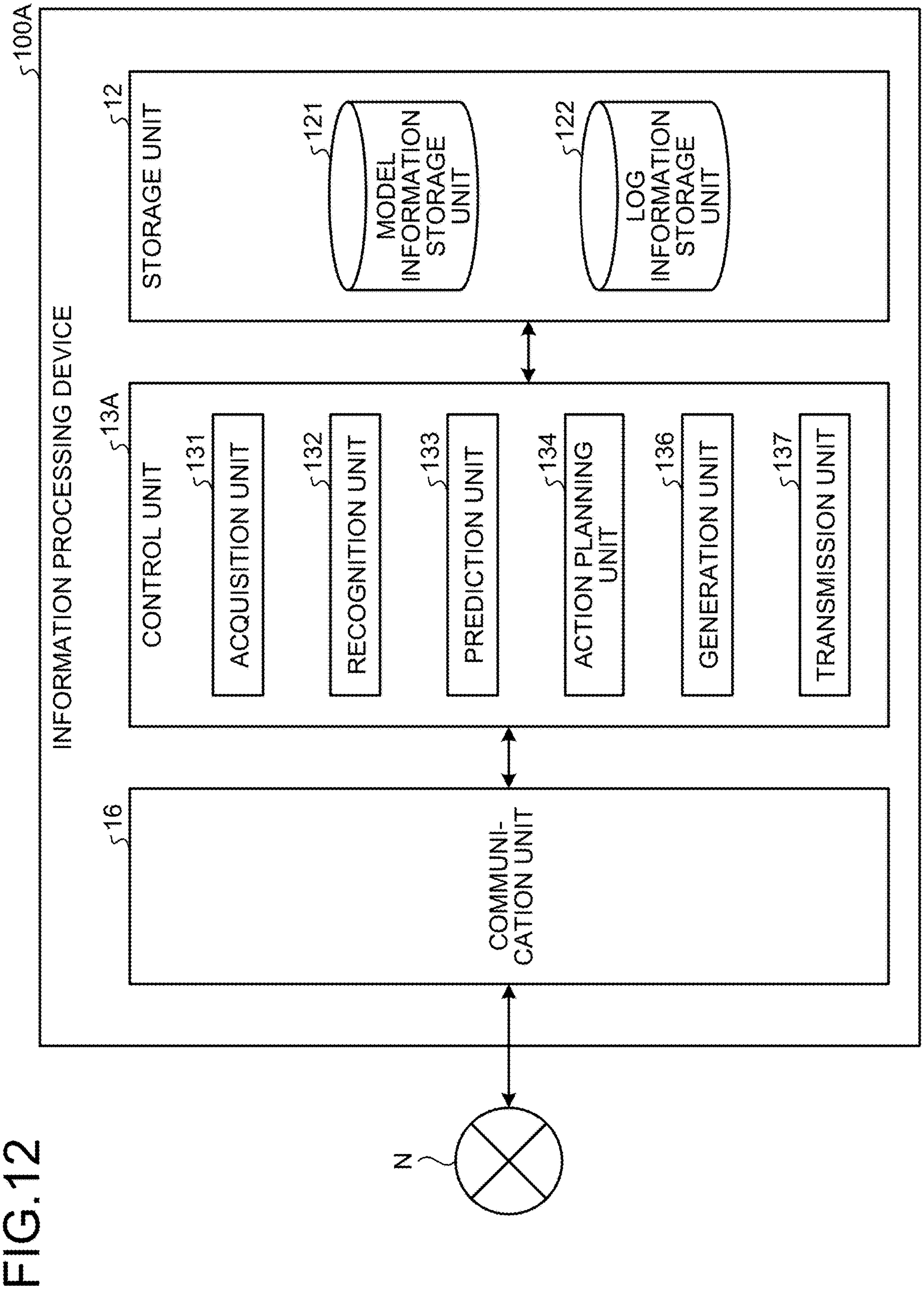
FIG. 12 is a diagram illustrating a configuration example of an information processing device according to a modification of the present disclosure.

In addition, the information processing device that generates basis information is not limited to a form having a movement mechanism such as the moving body device 100, a robot, or the like, and may be an information processing device 100A that performs only information processing as illustrated in FIG. 12. The information processing device that generates basis information may be applied to a financial field. For example, the information processing device that generates basis information may be applied to prediction of an index (financial index) related to finance. For example, the information processing device that generates basis information may be applied to prediction of stock price that is an example of the financial index. In this case, the information processing device that generates basis information may generate basis information indicating a basis of the predicted stock price. For example, the information processing device that generates basis information may generate the basis information indicating the basis of the predicted stock price using the LIME technique for a model that outputs prediction information of the stock price with weather information such as climate or social information such as politics as an input.

[1-1-4. AI Ethics]

Note that the processing of the automatic driving described above will be briefly described from the viewpoint of AI ethics. Hereinafter, a case where a vehicle that performs automatic driving (automatic driving vehicle) detects the same type of objects will be described as an example.

For example, the automatic driving vehicle detects four objects (an object group A) of the same type (a category X) in the proceeding direction, and detects two objects (an object group B) of the category X on the right side of the proceeding direction. Note that the category X may be any category such as a living thing such as a dog and a person, or an inanimate thing such as a utility pole, a car, and a house.

Then, it is assumed that it is difficult for the automatic driving vehicle to make an emergency stop in time even if an automatic brake is operated. In this case, the automatic driving vehicle inevitably comes into contact with either the object group A or the object group B. Therefore, the automatic driving vehicle selects (determines) an action accompanied by the contact with either the object group A or the object group B.

In such a case, a person can recognize what kind of basis information is used as a basis for the action selected by the automatic driving vehicle by generating the basis information indicating the determination basis as described above. In the above example, whether the automatic driving vehicle has correctly recognized both the object group A and the object group B can be elucidated by the visualization technique. That is, in the above example, it is possible to elucidate whether the automatic driving vehicle has selected (determined) the action after correctly recognizing both the object group A and the object group B or selected (determined) the action in a situation where the object group A or the object group B has not been correctly recognized.

More generally, it is possible to indicate, to a person, the basis of the action performed by artificial intelligence (AI) such as the automatic driving vehicle in a form that can be recognized by a person, and thus, it is possible to appropriately determine whether the AI has performed the action after performing correct recognition or has performed the action in a state where appropriate recognition has not been performed.

As described above, whether the moving body device 100 can elucidate whether the external environment has been appropriately recognized by the visualization technique. Specifically, the moving body device 100 can elucidate whether all the objects have been correctly recognized by the visualization technique. As a result, the moving body device 100 can enable elucidation of whether the selected (determined) action is caused by the determination (decision-making) or is caused not by the determination but by the recognition (sensing) due to the incomplete recognition. For example, in a case where an action performed by the moving body device 100 has a problem in terms of ethics, the moving body device 100 can enable elucidation of whether the action is caused by the determination (decision-making) or is caused not by the determination but by the recognition (sensing) due to the incomplete recognition. Note that the description has been given by exemplifying the same type (same category) of the objects in the above-described example in order to simplify the description, but the above-described point can be similarly applied to a case of different types of objects.

[1-2. Configuration of Moving Body Device According to Embodiment]

Figure 3:
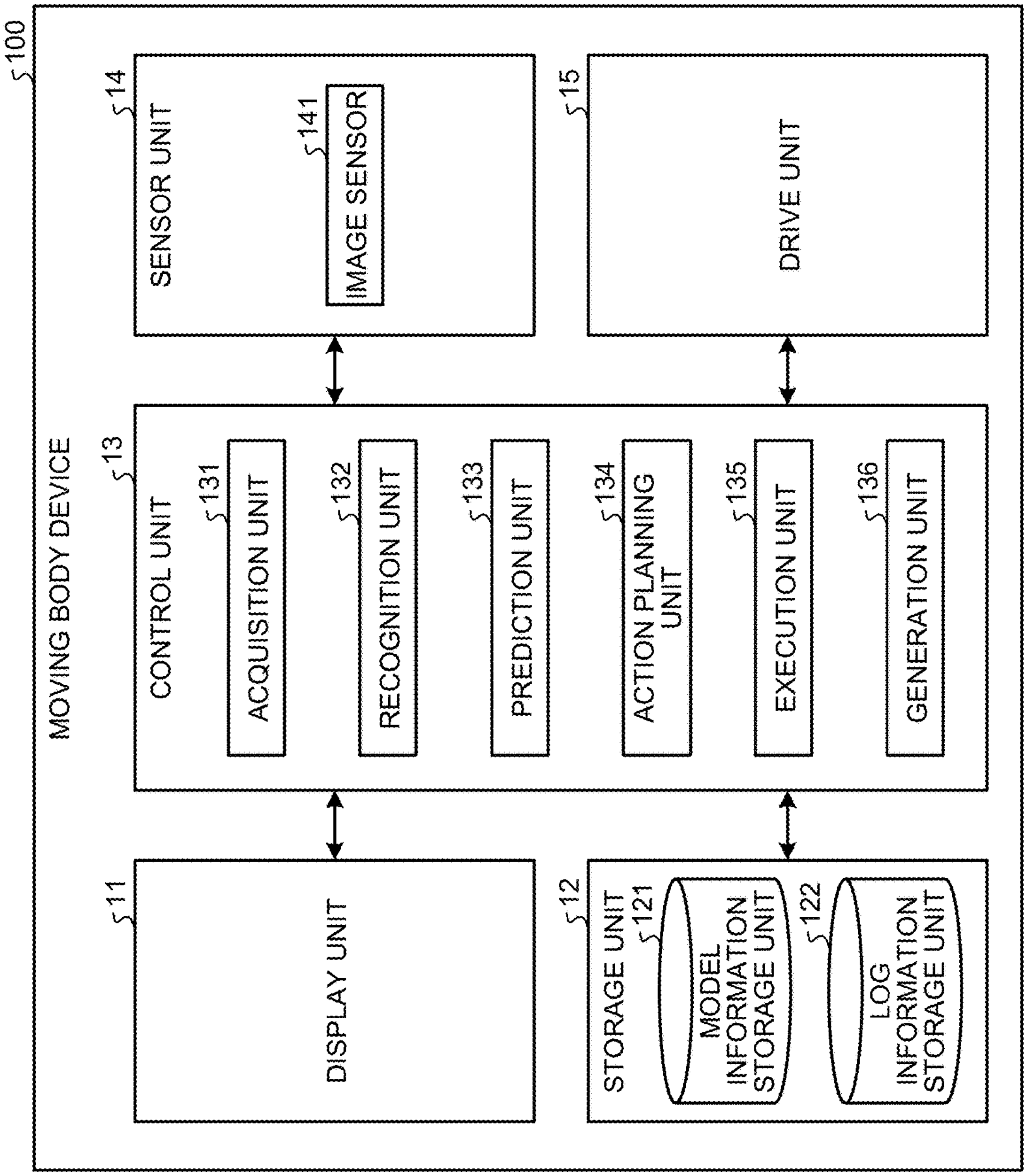
FIG. 3 is a diagram illustrating a configuration example of a moving body device according to the embodiment.

Next, a configuration of the moving body device 100, which is an example of the information processing device that executes the information processing according to the embodiment, will be described. FIG. 3 is a diagram illustrating a configuration example of the moving body device 100 according to the embodiment.

As illustrated in FIG. 3, the moving body device 100 includes the display unit 11, the storage unit 12, a control unit 13, the sensor unit 14, and a drive unit 15. Note that the moving body device 100 has a configuration that implements a function of receiving a driving operation by a user riding on the device, such as the user U, but the configuration is a typical configuration of a vehicle (automobile), and thus, the description thereof will be appropriately omitted. For example, the moving body device 100 includes a steering wheel unit (operation unit), a brake unit, an accelerator unit, and the like that receive various driving operations by the user although not illustrated.

Note that, the moving body device 100 may include a communication unit in the case of transmitting and receiving information to and from an external device. The communication unit is realized by, for example, a network interface card (NIC), a communication circuit, or the like. The communication unit is connected to a network N (the Internet or the like) in a wired or wireless manner, and transmits and receives information to and from another device or the like via the network N.

The display unit 11 displays various types of information. The display unit 11 is a display device (display unit) such as a display, and displays various types of information. For example, the display unit 11 may be arranged inside the moving body device 100. The display unit 11 may be arranged at a position that can be visually recognized by the user in the moving body device 100, for example, on the front side inside the moving body device 100. The display unit 11 may be a windshield or the like of the moving body device 100. In this case, the display unit 11 may display various types of information using technologies related to augmented reality (AR) and mixed reality (MR). The display unit 11, which is the windshield, displays basis information in a transparent manner. For example, the display unit 11 displays the basis information that is transparent to be superimposed on a range in which an image has been captured. For example, the display unit 11 displays the basis information RINF1 by matching a corresponding region in the basis information RINF1, which is the heat map, with a position of the object OB11. The display unit 11 displays information recognized by a recognition unit 132. The display unit 11 displays information predicted by a prediction unit 133. The display unit 11 displays information generated by the generation unit 136.

The display unit 11 displays the basis information. The display unit 11 displays the basis information as a diagram. The display unit 11 displays the basis information which is image information. The display unit 11 displays the basis information which is a heat map. The display unit 11 displays the basis information as a character. The display unit 11 displays the basis information as a numerical value.

In the example of FIG. 1, the display unit 11 displays the basis information RINF1. The display unit 11 visualizes the basis information by displaying the basis information RINF1. The display unit 11 displays information indicating a basis of an action based on the basis information generated based on one or a plurality of basis generation algorithms and/or sensor information.

In addition, the moving body device 100 may have a functional configuration that outputs information without being limited to the display unit 11. Note that the moving body device 100 may have a function of outputting information as a voice. For example, the moving body device 100 may include a voice output unit, such as a speaker, that outputs a voice.

The storage unit 12 is realized by, for example, a semiconductor memory element such as a random access memory (RAM) and a flash memory, or a storage device such as a hard disk and an optical disk. Note that the storage unit 12 includes a model information storage unit 121 and the log information storage unit 122. Note that the storage unit 12 stores various types of information without being limited to the model information storage unit 121 and the log information storage unit 122. For example, the storage unit 12 stores various types of information regarding roads and maps on which the moving body device 100, which is an automobile, travels. The storage unit 12 includes a map information storage unit that stores various types of information regarding maps.

The map information storage unit stores various types of information regarding maps. The map information storage unit stores various types of information regarding maps necessary for automatic driving.

The model information storage unit 121 according to the embodiment stores information regarding a model. For example, the model information storage unit 121 stores information (model data) indicating a structure of a model (network). FIG. 4 is a diagram illustrating an example of the model information storage unit according to the embodiment of the present disclosure. FIG. 4 illustrates an example of the model information storage unit 121 according to the embodiment. In the example illustrated in FIG. 4, the model information storage unit 121 includes items such as a "model ID", a "use", and "model data".

The "model ID" indicates identification information for identifying a model. The "use" indicates a use of a corresponding model. The "model data" indicates data of a model. Although FIG. 4 illustrates an example in which conceptual information such as "MDT1" is stored in the "model data", various types of information constituting a model, such as information regarding a network and a function included in the model, are included in practice.

In the example illustrated in FIG. 4, a model identified by a model ID "M1" (the model M1) indicates that its use is "image recognition". In addition, model data of the model M1 indicates the model data MDT1. For example, the model data MDT1 of the model M1 includes various types of information such as a network structure of the model M1 such as a deep neural network and a parameter such as a weight.

In addition, a model identified by a model ID "M2" (the model M2) indicates that its use is "prediction". In addition, model data of the model M2 indicates model data MDT2. For example, the model data MDT2 of the model M2 includes various types of information such as a network structure of the model M2 such as a deep neural network and a parameter such as a weight.

In addition, a model identified by a model ID "M3" (the model M3) indicates that its use is "action planning". In addition, model data of the model M3 indicates model data MDT3. For example, the model data MDT3 of the model M3 includes various types of information such as a network structure of the model M3 such as a deep neural network and a parameter such as a weight.

Note that the model information storage unit 121 may store various types of information according to a purpose without being limited thereto.

The log information storage unit 122 according to the embodiment stores information regarding a log (history). For example, the log information storage unit 122 stores information indicating a history related to recognition, prediction, and action planning in the automatic driving. The log information storage unit 122 stores information in which input information with respect to a model in the automatic driving is associated with basis information regarding an output of the model. FIG. 5 is a diagram illustrating an example of the log information storage unit according to the embodiment of the present disclosure. In the example illustrated in FIG. 5, the log information storage unit 122 includes items such as a "log ID", "input information", and "basis information".

The "log ID" indicates identification information for identifying a log (history). The "input information" indicates corresponding input information. Although FIG. 5 illustrates an example in which conceptual information such as "IND1" is stored in the "input information", various types of data such as an input image or a file path name indicating a storage location thereof is stored in practice.

The "basis information" indicates corresponding basis information. Although FIG. 5 illustrates an example in which conceptual information such as "RINF1" is stored in the "basis information", various types of data such as an image generated as the basis information or a file path name indicating a storage location thereof is stored in practice.

In the example illustrated in FIG. 5, a log identified by a log ID "LG1" (a log LG1) indicates that the input information is "IND1" and the basis information is "RINF1". In this manner, the example of FIG. 5 illustrates a case where the input information IND1 and the basis information RINF1 are associated. That is, the log LG1 indicates that basis information indicating a basis related to an output corresponding to the input information IND1 is the basis information RINF1.

Note that the log information storage unit 122 may store various types of information according to a purpose without being limited thereto. The log information storage unit 122 stores not only the basis information but also various pieces of information in association with the input information. The log information storage unit 122 stores input information in association with a recognition result, a prediction result, an action plan, travel information of a moving body, and the like corresponding to the input information. For example, the log information storage unit 122 stores the input information IND1 in association with the route PP11 and actual travel information of the moving body device 100 based on the route PP11.

Returning to FIG. 3, the description will be continued. The control unit 13 is realized as, for example, a central processing unit (CPU), a micro processing unit (MPU), or the like executes a program (for example, the information processing program according to the present disclosure) stored inside the moving body device 100 using a random access memory (RAM) or the like as a work area. Further, the control unit 13 is a controller, and may be realized by, for example, an integrated circuit such as an application specific integrated circuit (ASIC) and a field programmable gate array (FPGA).

As illustrated in FIG. 3, the control unit 13 includes an acquisition unit 131, a recognition unit 132, a prediction unit 133, an action planning unit 134, an execution unit 135, and a generation unit 136, and implements or executes functions and operations of the information processing to be described below. Note that an internal configuration of the control unit 13 is not limited to the configuration illustrated in FIG. 3, and may be another configuration as long as the information processing to be described later is performed with the configuration.

The acquisition unit 131 acquires various types of information. The acquisition unit 131 acquires various types of information from an external information processing device. The acquisition unit 131 acquires various types of information from the storage unit 12. The acquisition unit 131 acquires various types of information from the model information storage unit 121 and the log information storage unit 122.

The acquisition unit 131 acquires sensor information detected by the sensor unit 14. The acquisition unit 131 stores the acquired information in the storage unit 12. The acquisition unit 131 acquires image information detected by the image sensor 141. The acquisition unit 131 acquires sensor information detected by a distance measuring sensor.

The acquisition unit 131 acquires a model having a structure of a neural network and input information input to the model. The acquisition unit 131 acquires a model to be used for control of a device that autonomously acts. The acquisition unit 131 acquires a model to be used for control of a moving body that is autonomously movable. The acquisition unit 131 acquires a model to be used for control of a moving body which is a vehicle operated by automatic driving.

The acquisition unit 131 acquires a model, which performs an output in response to an input of sensor information, and input information which is the sensor information detected by a sensor. The acquisition unit 131 acquires a model, which outputs a recognition result of image information in response to an input of the image information, and input information which is the image information. The acquisition unit 131 acquires a model including a CNN. The acquisition unit 131 acquires a model, which performs an output in response to an input of output information output from another model, and input information which is the output information output from the another model.

In the example of FIG. 1, the acquisition unit 131 acquires the models M1 to M3 and the like from the model information storage unit 121. The acquisition unit 131 acquires the model M1 to be used for a recognition process. The acquisition unit 131 acquires the model M2 to be used for a prediction process. The acquisition unit 131 acquires the model M3 used for an action planning process. The acquisition unit 131 acquires the image IM1 detected by the image sensor 141. The acquisition unit 131, the acquisition unit 131 acquires the image IM1 as the input information IND1 to the model M1.

The recognition unit 132 performs a recognition process. The recognition unit 132 performs various types of recognition. The recognition unit 132 recognizes an object. The recognition unit 132 recognizes an object using various types of information. The recognition unit 132 generates various types of information regarding a recognition result of an object. The recognition unit 132 recognizes an object based on information acquired by the acquisition unit 131. The recognition unit 132 recognizes an object using various types of sensor information detected by the sensor unit 14. The recognition unit 132 recognizes an object using image information (sensor information) captured by the image sensor 141. The recognition unit 132 recognizes an object included in the image information. The recognition unit 132 recognizes various types of information based on information stored in the model information storage unit 121 or the log information storage unit 122.

In the example of FIG. 1, the recognition unit 132 performs the recognition process based on the image IM1 captured by the image sensor 141. The recognition unit 132 performs the process of recognizing an object or the like included in the image IM1. The recognition unit 132 performs the recognition process using the model M1. For example, the recognition unit 132 inputs the image IM1 to the model M1 as input information IND1, thereby causing the model M1 to output a recognition result.

The prediction unit 133 performs a prediction process. The prediction unit 133 predicts various types of information. The prediction unit 133 predicts various types of information based on information acquired from an external information processing device. The prediction unit 133 predicts various types of information based on information stored in the storage unit 12. The prediction unit 133 predicts various types of information based on information stored in the model information storage unit 121 or the log information storage unit 122.

In the example of FIG. 1, the prediction unit 133 performs the prediction process based on an output of the model M1. The prediction unit 133 performs the process of predicting an action (motion mode) such as movement of an object included in the image IM1. The prediction unit 133 performs the prediction process using the model M2. For example, the prediction unit 133 inputs information (recognition result information) output from the model M1 to the model M2, thereby causing the model M2 to output a prediction result.

The prediction unit 133 predicts a motion mode of the object OB11 which is the person. The prediction unit 133 predicts a movement direction and a speed of the object OB11. The prediction unit 133 predicts that the object OB11 is moving toward the prediction unit 133. In addition, the prediction unit 133 predicts a motion mode of the object OB12 which is the vehicle. The prediction unit 133 predicts a movement direction and a speed of the object OB12. The prediction unit 133 predicts that the object OB12 is moving toward the moving body device 100.

The action planning unit 134 makes various plans. The action planning unit 134 determines an action plan. The action planning unit 134 generates various types of information regarding the action plan. The action planning unit 134 makes various plans based on information acquired by the acquisition unit 131. The action planning unit 134 makes various plans using information predicted by the prediction unit 133. The action planning unit 134 makes an action plan using various technologies related to the action plan.

The action planning unit 134 determines an action plan based on information predicted by the prediction unit 133. The action planning unit 134 determines an action plan for movement so as to avoid an obstacle included in an obstacle map based on the information predicted by the prediction unit 133.

In the example of FIG. 1, the action planning unit 134 performs a process of generating an action plan based on an output of the model M2. The action planning unit 134 determines the action plan based on the predicted motion modes of the object OB11 and the object OB12. The action planning unit 134 performs the process of determining the action plan using the model M3. For example, the action planning unit 134 inputs information (prediction result information) output from the model M2 to the model M3, thereby causing the model M3 to output the action plan.

The action planning unit 134 determines the action plan so as to avoid the object OB11 since the objects OB11 and OB12 are located in the proceeding direction of the own unit, and coming toward the moving body device 100, and it is difficult to avoid both the objects OB11 and OB12. The action planning unit 134 plans the route PP11 to proceed to the right side of the proceeding direction in order to avoid a collision with the object OB11 located on the left side of the proceeding direction. The action planning unit 134 generates action plan information indicating the route PP11.

The execution unit 135 executes various types of information. The execution unit 135 executes various processes based on information from an external information processing device. The execution unit 135 executes various processes based on information stored in the storage unit 12. The execution unit 135 executes various types of information based on information stored in the map information storage unit. The execution unit 135 determines various types of information based on information acquired by the acquisition unit 131.

The execution unit 135 executes various processes based on information predicted by the prediction unit 133. The execution unit 135 executes various processes based on an action plan planned by the action planning unit 134. The execution unit 135 executes processing related to an action based on information of the action plan generated by the action planning unit 134. The execution unit 135 controls the drive unit 15 based on the information of the action plan generated by the action planning unit 134 to execute the action corresponding to the action plan. The execution unit 135 executes movement processing of the moving body device 100 according to the action plan under the control of the drive unit 15 based on the information of the action plan.

In the example of FIG. 1, the execution unit 135 controls the automatic driving based on the action plan information indicating the route PP11. The execution unit 135 controls the movement of the moving body device 100 so as to avoid the object OB11 which is the person based on the action plan information indicating the route PP11.

The generation unit 136 performs various types of generation. The generation unit 136 generates various types of information based on information stored in the storage unit 12. The generation unit 136 generates various types of information based on information stored in the model information storage unit 121 or the log information storage unit 122. The generation unit 136 generates various types of information based on sensor information detected by the sensor unit 14. The generation unit 136 generates various types of information based on image information detected by the image sensor 142.

The generation unit 136 generates various types of information based on information acquired by the acquisition unit 131. The generation unit 136 generates various types of information based on a recognition result of the recognition unit 132. The generation unit 136 generates various types of information based on a prediction result of the prediction unit 133. The generation unit 136 generates various types of information based on an action plan of the action planning unit 134.

The generation unit 136 generates basis information indicating a basis for an output of a model after input information is input to the model based on state information indicating a state of the model after the input of the input information to the model. The generation unit 136 generates the basis information indicating the basis of processing using the output of the model.

The generation unit 136 generates basis information indicating a basis for control of a device after input information is input to a model. The generation unit 136 generates basis information indicating a basis for control of a moving body after input information is input to the model. The generation unit 136 generates basis information indicating a basis for a movement direction of the moving body.

The generation unit 136 generates basis information of a model to which input information has been input in response to detection by a sensor. The generation unit 136 generates image information indicating a basis for an output of the model as the basis information. The generation unit 136 generates a heat map indicating a basis for an output of the model as the basis information.

The generation unit 136 generates basis information based on state information including a state of a convolutional layer of a model. The generation unit 136 generates basis information by processing related to class activation mapping (CAM). The generation unit 136 generates basis information by Grad-CAM.

The generation unit 136 generates basis information of a model to which input information has been input in response to an output of another model. The generation unit 136 generates the basis information based on state information including an output result of the model after the input of the input information to the model. The generation unit 136 generates the basis information based on a basis model learned using the input information and the output result. The generation unit 136 generates the basis information using the basis model that is locally approximated with a combination of the input information and the output result as a target. The generation unit 136 generates the basis information by processing related to LIME.

The generation unit 136 stores log information in which input information and basis information are associated with each other in the storage unit. The generation unit 136 generates various types of information to be displayed on the display unit 13. The generation unit 136 generates various types of information such as character information and image information such as a graph to be displayed on the display unit 11.

Note that the generation unit 136 may generate information (an image) related to a screen, such as the basis information RINF1 which is the heat map illustrated in FIG. 1, by appropriately using various conventional techniques related to the image. The generation unit 136 generates an image, such as a graph GR11 illustrated in FIG. 1, by appropriately using various conventional techniques related to a GUI. For example, the generation unit 136 may generate an image, such as a heat map HM11, using CSS, JavaScript (registered trademark), HTML, or any language capable of describing information processing such as information display and operation reception described above.

In the example of FIG. 1, the generation unit 136 generates the basis information indicating the basis for the output of the model after the input information is input to the model based on the state information indicating the state of the model M1 after the input of the input information to the model M1. The generation unit 136 generates the basis information indicating the basis for the output of the model M1 after the image IM1 is input to the model M1 based on the state information indicating the state of the model M1 after the input of the image IM1 to the model M1.

The generation unit 136 generates the basis information indicating the basis for the output of the model M1 after the input of the image IM1 by Grad-CAM. The generation unit 136 generates the basis information indicating the basis for the output of the model M1 after the input of the image IM1 by the above-described processing related to Grad-CAM.

The generation unit 136 designates a target type (class) and generates information (an image) corresponding to the designated class. For example, the generation unit 136 generates the information (image) with the designated class as the target by various types of processing using the Grad-CAM technique. The generation unit 136 designates a class of the type "person" and generates the image which is the basis information RINF1 corresponding to the type "person".

The generation unit 136 generates the basis information RINF1 which is an image indicating a range (region) gazed for recognition (classification) of the type "person" in a form of a heat map (color map). The generation unit 136 generates the basis information RINF1 indicating that a position of the object OB11 that is the person of the image IM1 is gazed the most and the object OB11 that is the person is recognized. The generation unit 136 functions as a basis information generation unit that generates basis information of an action based on a plurality of basis generation algorithms. The generation unit 136 generates basis information of an action based on the plurality of basis generation algorithms such as an algorithm based on the Grad-CAM technique, an algorithm based on the LIME technique, and an algorithm based on the TCAV technique. The generation unit 136 generates basis information of an action using one basis generation algorithm among the plurality of basis generation algorithms. The generation unit 136 selects one basis generation algorithm among the plurality of basis generation algorithms, and generates basis information of an action using the selected basis generation algorithm. In the case of processing requiring the real-time property, the generation unit 136 selects an algorithm based on the Grad-CAM technique among the plurality of basis generation algorithms, and generates basis information of an action using the algorithm based on the selected Grad-CAM technique.

The sensor unit 14 detects predetermined information. The sensor unit 14 includes the image sensor 141. The image sensor 141 functions as an imaging means for capturing an image. The image sensor 141 detects image information.

Note that the sensor unit 14 may include various sensors without being limited to the image sensor 141. For example, the sensor unit 14 may include various sensors such as a position sensor, a distance measuring sensor, a sound sensor, an acceleration sensor, a gyro sensor, a temperature sensor, a humidity sensor, an illuminance sensor, a pressure sensor, a proximity sensor, and a sensor configured to acquire biometric information such as an odor, sweat, a heartbeat, a pulse, and brain waves.

For example, the distance measuring sensor detects a distance between an object to be measured and the distance measuring sensor. The distance measuring sensor detects information on the distance between the object to be measured and the distance measuring sensor. The distance measuring sensor may be an optical sensor. The sensor unit 14 includes light detection and ranging or laser imaging detection and ranging (LiDAR) as the distance measuring sensor. Note that the distance measuring sensor is not limited to the LiDAR, and may be various sensors such as a time of flight (ToF) sensor and a stereo camera. In addition, the distance measuring sensor may be a distance measuring sensor using a millimeter wave radar. Note that the distance measuring sensor is not limited to the LiDAR, and may be various sensors such as a ToF sensor and a stereo camera.

In addition, for example, the position sensor detects a position of the moving body device 100. The position sensor may be various sensors such as a global positioning system (GPS) sensor. In addition, the above-described sensors that detect various types of information in the sensor unit 14 may be a common sensor or may be realized by different sensors.

The drive unit 15 has a function of driving a physical configuration in the moving body device 100. The drive unit 15 has a function for moving a position of the moving body device 100. The drive unit 15 has a function for moving the position of the moving body device 100 which is the automobile. The drive unit 15 is, for example, a motor or the like. The drive unit 15 drives a tire or the like of the moving body device 100 which is the automobile. Note that the drive unit 15 may have any configuration as long as the moving body device 100 can implement a desired operation. The drive unit 15 may have any configuration as long as it is possible to implement the movement of the position of the moving body device 100 and the like. For example, the drive unit 15 drives a moving mechanism of the moving body device 100 in accordance with a driving operation performed by the user or an instruction from the execution unit 135 to move the moving body device 100 and change the position of the moving body device 100.

[1-2-1. Model Examples]

As described above, the moving body device 100 may use various forms of models (functions). For example, the moving body device 100 may use a regression model such as a support vector machine (SVM) or a model (function) of any form such as a neural network. The moving body device 100 may use various regression models such as a nonlinear regression model and a linear regression model.

In this regard, an example of a network structure of a model will be described with reference to FIG. 6. FIG. 6 is a diagram illustrating an example of a model according to the embodiment of the present disclosure. A network NW1 illustrated in FIG. 6 represents a neural network including a plurality of (multiple) intermediate layers between an input layer INL and an output layer OUTL. The network NW1 has a structure such as a deep neural network having four or more layers, a so-called deep neural network (deep learning).

The network NW1 illustrated in FIG. 6 corresponds to, for example, a network of the model M1, and is a conceptual diagram illustrating a neural network (model) used for image recognition. For example, when an image is input from the input layer INL side, for example, the network NW1 outputs a recognition result from the output layer OUTL. For example, the moving body device 100 inputs information to the input layer INL in the network NW1 to output a recognition result corresponding to the input from the output layer OUTL.

Note that the network NW1 is illustrated as an example of the model (network) in FIG. 6, but the network NW1 may have various forms depending on a use or the like. In addition, not only the model M1 but also the models M2 and M3 have a similar structure such as a deep neural network (deep learning).

[1-3. Procedure of Information Processing According to Embodiment]

Figure 7:
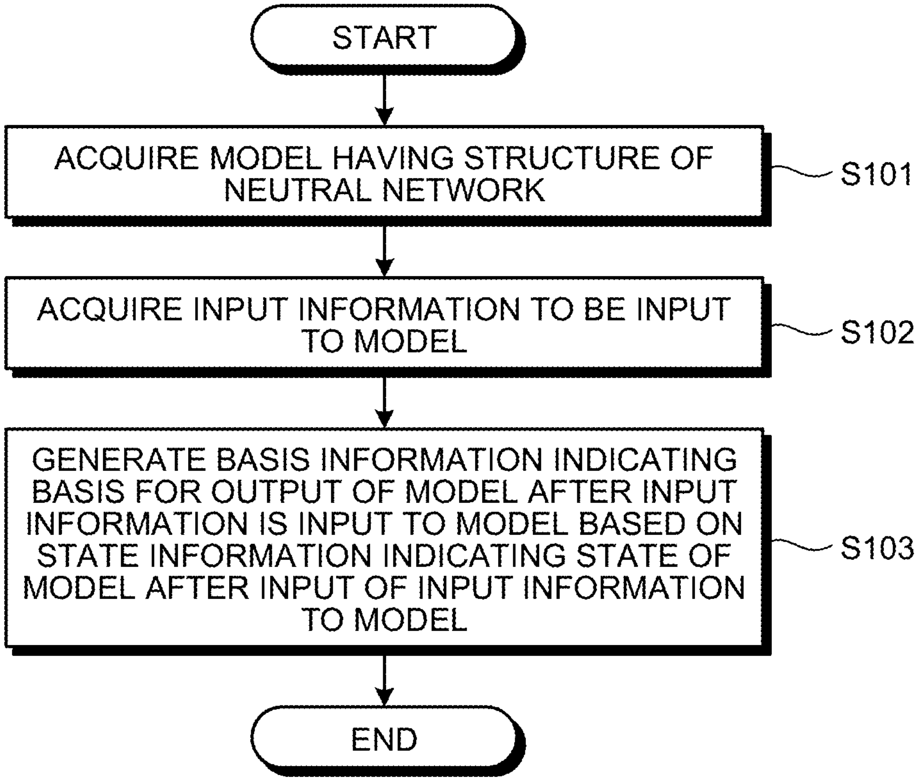
FIG. 7 is a flowchart illustrating a procedure of the information processing according to the embodiment.

Next, a procedure of the information processing according to the embodiment will be described with reference to FIGS. 7 and 8. First, a flow of learning processing according to the embodiment will be described with reference to FIG. 7. FIG. 7 is a flowchart illustrating the procedure of the information processing according to the embodiment.

As illustrated in FIG. 7, the moving body device 100 acquires a model having a structure of a neural network (Step S101). For example, the moving body device 100 acquires the model M1 from the model information storage unit 121 (see FIG. 3).

The moving body device 100 acquires input information to be input to the model (Step S102). For example, the moving body device 100 acquires the image IM1 as the input information IND1 to be input to the model M1.

Then, the moving body device 100 generates basis information indicating a basis for an output of the model after the input information is input to the model based on state information indicating a state of the model after the input of the input information to the model (Step S103). For example, the moving body device 100 generates the basis information RINF1 indicating the basis for the output of the model M1 after the input information is input to the model M1 based the state information indicating the state of the model M1 after the input of the input information IND1 to the model M1. Then, the moving body device 100 displays the generated basis information RINF1.

Next, a procedure of a process of controlling a moving body will be described with reference to FIG. 8. A detailed flow of the movement control process of the moving body device 100 will be described with reference to FIG. 8. FIG. 8 is a flowchart illustrating the procedure of the process of controlling the moving body.

Figure 8:
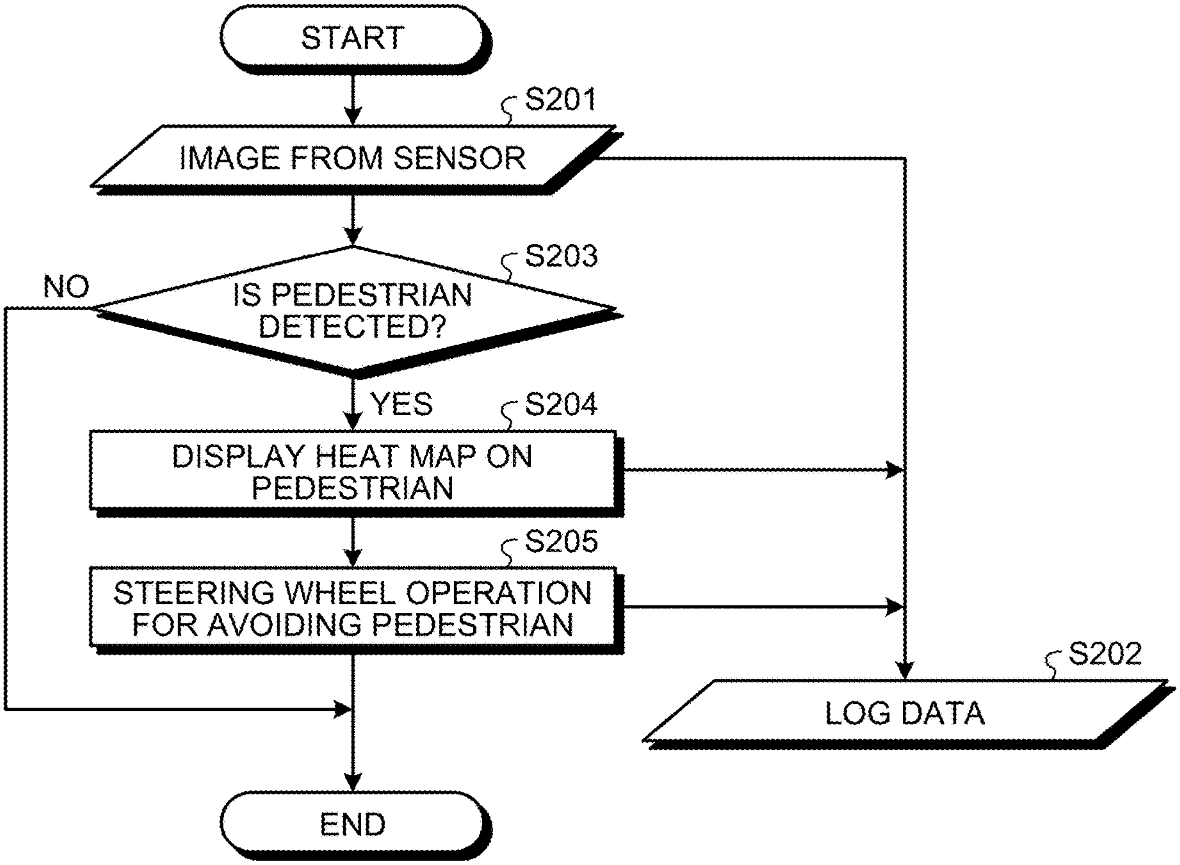
FIG. 8 is a flowchart illustrating a procedure of a process of controlling a moving body.

As illustrated in FIG. 8, the moving body device 100 acquires an image from a sensor (Step S201). For example, the moving body device 100 acquires the image from the image sensor 141.

Then, the moving body device 100 stores the acquired image as log data (Step S202). For example, the moving body device 100 stores the image as the log data in the log information storage unit 122.

Then, when a pedestrian is detected (Step S203: Yes), the moving body device 100 displays a heat map on the pedestrian (Step S204). For example, when the pedestrian is detected, the moving body device 100 generates and displays basis information which is the heat map in a mode of attracting attention to a position of the pedestrian.

Then, the moving body device 100 stores the generated basis information as log data (Step S202). For example, the moving body device 100 stores the generated basis information in the log information storage unit 122 in association with the image serving as a generation base.

Then, the moving body device 100 executes a steering wheel operation for avoiding the pedestrian (Step S205). For example, the moving body device 100 receives the steering wheel operation performed by the user and executes the movement control according to the received steering wheel operation.

Then, the moving body device 100 stores information on the received steering wheel operation as log data (Step S202). For example, the moving body device 100 stores the information on the received steering wheel operation in the log information storage unit 122 in association with the corresponding image and basis information.

On the other hand, when a pedestrian is not detected (Step S203: No), the moving body device 100 ends the processing without performing the processes of Steps S204 and S205.

[1-4. Another Example of Information Processing]

Figure 9:
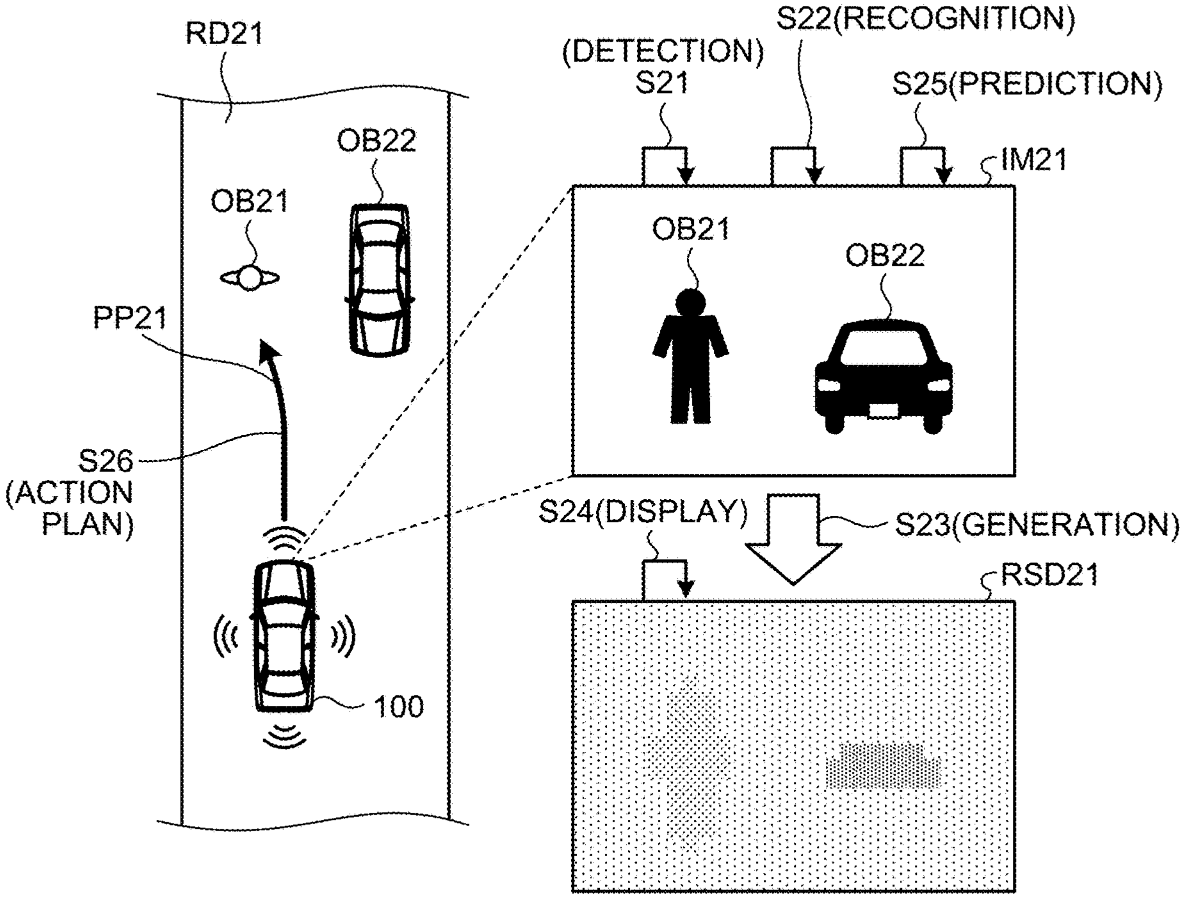
FIG. 9 is a diagram illustrating another example of the information processing according to the embodiment.

Note that the example of FIG. 1 illustrates the case where the moving body device 100 has appropriately recognized an object such as a pedestrian. However, the moving body device 100 is not limited to the case of capable of appropriately recognizing an object, and there may be a case where it is difficult for the moving body device 100 to appropriately recognize an object due to various conditions. Even in such a case, it is useful for the moving body device 100 to generate basis information. This point will be described with reference to FIG. 9. FIG. 9 is a diagram illustrating another example of the information processing according to the embodiment. Note that the similar points with FIG. 1 will not be described as appropriate.

The example illustrated in FIG. 9 illustrates a case where a user (user U) rides on the moving body device 100 and the moving body device 100 is traveling on a road RD21. Specifically, the example illustrated in FIG. 9 illustrates a case where a direction from the moving body device 100 toward objects OB21 and OB22, which will be described later, is the front of the moving body device 100 and the moving body device 100 is traveling forward. Note that a side portion of the road RD21 is a region, such as a wall surface, which the moving body device 100 is not allowed to enter. First, the moving body device 100 performs detection by the sensor unit 14 (see FIG. 3) (Step S21). In the example of FIG. 9, the moving body device 100 detects (captures) an image IM21 by the image sensor 141.

Then, the moving body device 100 performs a recognition process (Step S22). The moving body device 100 performs the recognition process based on the image IM21 captured by the image sensor 141. The moving body device 100 performs the process of recognizing an object or the like included in the image IM21. The moving body device 100 performs the recognition process using the model M1 in the same manner as in FIG. 1.

In the example of FIG. 9, the moving body device 100 inputs the image IM21 to the model M1, thereby causing the model M1 to output information indicating that the object OB21 of a type “person” is present at a position (region) on the left side of the image IM21. In addition, the moving body device 100 inputs the image IM21 to the model M1, thereby causing the model M1 to output information indicating that the object OB22 of a type “vehicle” is present at a position (region) on the right side of the image IM21. Then, the moving body device 100 performs processes of Steps S23 to S26. Note that Steps S23 to S26 are attached to the respective processes in the example of FIG. 9 for convenience of description, but it does not indicate that Step S25 is performed after Step S24. For example, the processes of Steps S23 and S24 and the processes of Steps S25 and S26 are performed in parallel.

First, the processes of Steps S23 and S24 will be described. The moving body device 100 performs a generation process (Step S23). The moving body device 100 generates basis information indicating a basis for the output of the model after the input information is input to the model based on state information indicating a state of the model M1 after the input of the input information to the model M1. The moving body device 100 generates the basis information indicating the basis for the output of the model M1 after the image IM21 is input to the model M1 based on the state information indicating the state of the model M1 after the input of the image IM21 to the model M1.

In the example of FIG. 9, the moving body device 100 generates the basis information indicating the basis for the output of the model M1 after the input of the image IM21 by Grad-CAM. In the example of FIG. 9, the moving body device 100 designates a class of the type "person" and generates an image which is basis information RINF21 corresponding to the type "person". The basis information RINF21 is the image indicating a range (region) gazed for recognition (classification) of the type "person" in a form of a so-called heat map (color map), which is similar to the basis information RINF1 in FIG. 1. In the example of FIG. 9, the basis information RINF21 indicates that the position of the object OB21 that is the person of the image IM21 is not gazed, and the object OB21 that is the person is not appropriately recognized. In addition, it is assumed that the moving body device 100 appropriately recognizes the object OB12 which is the vehicle in the example of FIG. 9.

Then, the moving body device 100 performs a display process (Step S24). The moving body device 100 displays the generated basis information RINF21 on the display unit 11 (see FIG. 3). In the example of FIG. 9, since the object OB21 that is the person is not appropriately recognized as indicated by the basis information RINF21, the user U may switch art automatic driving state of the moving body device 100 to manual driving to switch to traveling by his/her operation.

In addition, the moving body device 100 stores the basis information RINF21 in the storage unit 12 (see FIG. 3) as a history in association with the image IM21 which is the input information (input information IND21) that serves as the base of the basis information. For example, the moving body device 100 stores the input information IND21 and the basis information RINF21 in the log information storage unit 122 (see FIG. 3) in association with each other. As a result, it is possible to verify any input for which the moving body device 100 has performed a determination to perform the subsequent operation.

Hereinafter, the processes of Steps S25 and S26 will be described. Note that the process of Step S25 is performed immediately after the process of Step S22 is completed.

The moving body device 100 performs a prediction process based on the recognition result of the recognition process (Step S25). The moving body device 100 performs the prediction process based on the output of the model M1. The moving body device 100 performs the process of predicting an action (motion mode) such as movement of an object included in the image IM21. The moving body device 100 performs the prediction process using the model M2 in the same manner as in FIG. 1. The moving body device 100 predicts a motion mode of the recognized object OB22 which is the vehicle. The moving body device 100 predicts a movement direction and a speed of the object OB22. In the example of FIG. 9, the moving body device 100 predicts that the object OB22 is moving toward the moving body device 100.

The moving body device 100 performs a process of determining an action plan based on a prediction result of the prediction process (Step S26). The moving body device 100 performs a process of generating the action plan based on an output of the model M2. The moving body device 100 determines the action plan based on the predicted motion mode of the object OB22. The moving body device 100 performs the process of determining the action plan using the model M3 in the same manner as in FIG. 1. In the example of FIG. 9, the moving body device 100 determines the action plan so as to avoid the object OB22 since the object OB22 is located in a proceeding direction of the own device and is coming toward the moving body device 100. Specifically, the moving body device 100 plans a route PP21 to proceed to the left side of the proceeding direction in order to avoid a collision with the object OB22 located on the right side of the proceeding direction. The moving body device 100 generates action plan information indicating the route PP21. Then, the moving body device 100 controls automatic driving based on the action plan information indicating the route PP21. For example, the moving body device 100 stores the input information IND21 in the log information storage unit 122 (see FIG. 3) in association with the route PP21 and actual travel information of the moving body device 100 based on the route PP21. As a result, it is possible to verify which input the moving body device 100 has received and how the moving body device 100 has made a plan and traveled.

As described above, in the example of FIG. 9, the moving body device 100 has not detected (recognized) the object OB21, which is a pedestrian, using the image IM21 detected by the image sensor 141, and thus, displays the basis information RINF21 that is the heat map on which the object OB21 is not highlighted, on the display unit 11. In this manner, the pedestrian has not been detected from the sensor in the automatic driving in the example of FIG. 9, and thus, the pedestrian is displayed without being highlighted with the heat map by a visualization display device (for example, the display unit 11 or the like).

For example, in the example of FIG. 9, the moving body device 100 has not appropriately recognized the object OB21 that is the pedestrian, and thus, takes a course toward the object OB21 that is the pedestrian and approaches the object OB21 in order to avoid the object OB22 that is the vehicle. At this time, the moving body device 100 displays the basis information RINF21, which is the heat map on which the object OB21 as the pedestrian is not highlighted, in real time. As a result, an occupant of the moving body device 100 can recognize that the moving body device 100 is taking the course toward the person because the person has not been recognized. In this manner, the occupant of the moving body device 100 can know that the moving body device 100 traveling by the automatic driving has not appropriately recognized the person, and thus, tries to take the course in a direction where the person is present in order to avoid an oncoming car. Therefore, the occupant of the moving body device 100 can also avoid an accident of coming into contact with the person by stopping the automatic driving to switch to emergency manual driving and operating a steering wheel unit, a brake unit, or the like by himself/herself.

In addition, it is assumed that the moving body device 100 comes into contact with the object OB21 which is the pedestrian since the automatic driving has determined to proceed in the left direction in order to avoid the oncoming car which is the object OB22 in the example of FIG. 9. Even in such a case, the basis information RINF21 that is the heat map in which the object OB21 as the pedestrian is not highlighted is stored in the storage unit 12, and thus, the moving body device 300 can provide information indicating a reason (basis) of the contact with the object OB21 as the pedestrian is because the object OB21 has not been appropriately recognized. That is, the moving body device 100 can prove, from log data, that the contact accident with the person has occurred because an automatic driving system (sensor system) has not recognized the pedestrian as the elucidation.

[1-5. Conceptual Diagram of Configuration of In-Vehicle System]

Figure 10:
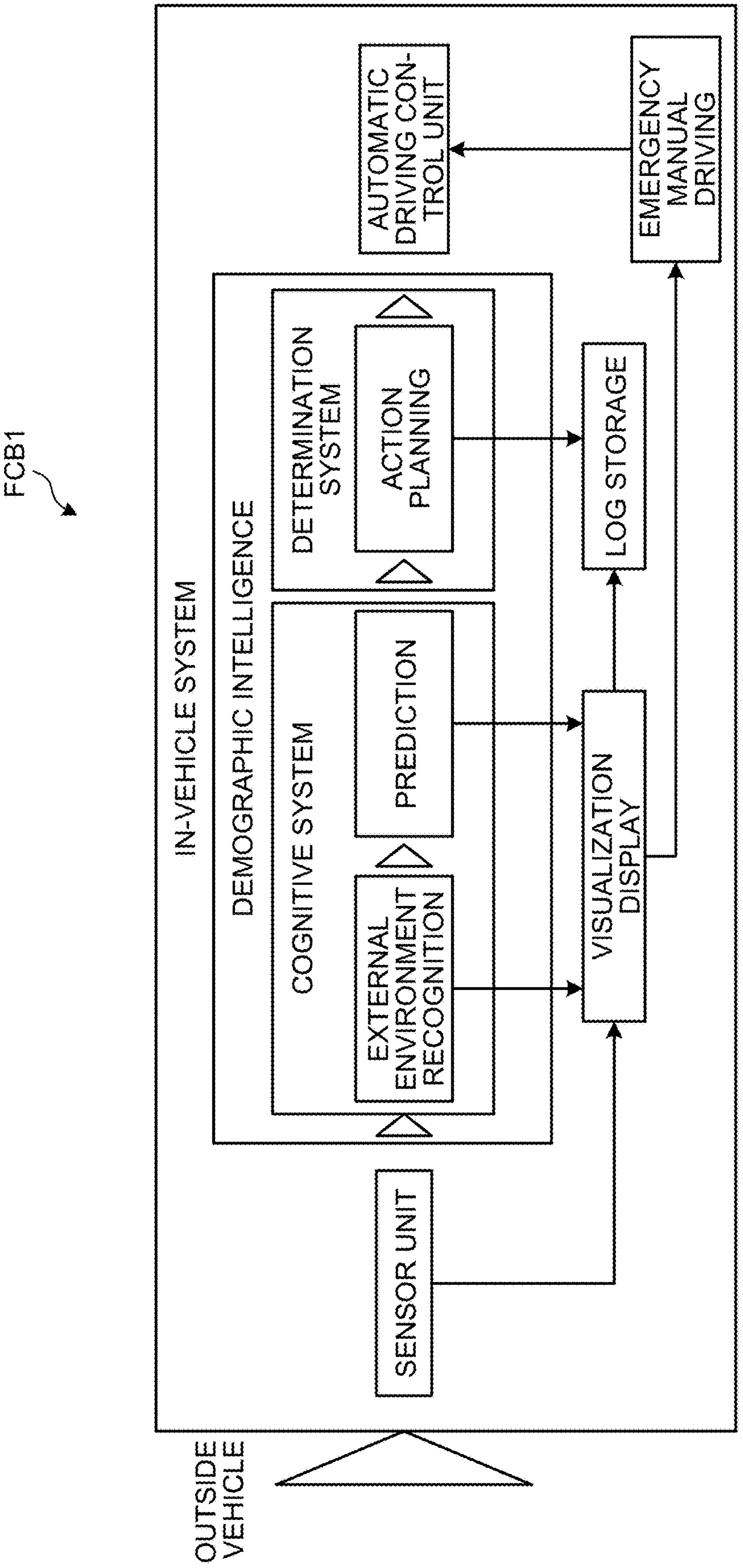
FIG. 10 is a diagram illustrating an example of a conceptual diagram of a configuration of an in-vehicle system.

Here, each function, a hardware configuration, and processing in an in-vehicle system will be conceptually described with reference to FIG. 10. FIG. 10 is a diagram illustrating an example of a conceptual diagram of a configuration of the in-vehicle system. An in-vehicle system FCB1 illustrated in FIG. 10 is a system mounted on a vehicle (moving body) to perform automatic driving. For example, the moving body device 100 is an automobile on which the in-vehicle system FCB1 as illustrated in FIG. 10 is mounted.

The in-vehicle system FCB1 illustrated in FIG. 10 includes a sensor unit, artificial intelligence, an automatic driving control unit, and the like. In addition, the in-vehicle system FCB1 performs processes such as visualization display, log storage, and emergency manual driving.

The sensor unit of the in-vehicle system FCB1 detects, for example, information outside the vehicle. The sensor unit of the in-vehicle system FCB1 corresponds to the sensor unit 14 or the like of the moving body device 100. The sensor unit of the in-vehicle system FCB1 captures an image.

The artificial intelligence of the in-vehicle system FCB1 includes a cognitive system and a determination system. The cognitive system of the in-vehicle system FCB1 performs external environment recognition and prediction processing. The cognitive system of the in-vehicle system FCB1 corresponds to the recognition unit 132, the prediction unit 133, or the like of the moving body device 100. The cognitive system of the in-vehicle system FCB1 performs external environment recognition based on information (sensor information) detected by the sensor unit of the in-vehicle system FCB1. In addition, the cognitive system of the in-vehicle system FCB1 performs prediction based on a result of the external environment recognition.

The determination system of the in-vehicle system FCB1 performs a process of planning an action. The determination system of the in-vehicle system FCB1 corresponds to the action planning unit 134 or the like of the moving body device 100. The determination system of the in-vehicle system FCB1 performs action planning based on a prediction result of the cognitive system of the in-vehicle system FCB1.

The automatic driving control unit of the in-vehicle system FCB1 controls automatic driving. The automatic driving control unit of the in-vehicle system FCB1 corresponds to the execution unit 135 of the moving body device 100, the respective configurations for controlling driving, or the like. The automatic driving control unit of the in-vehicle system FCB1 controls driving based on an action plan generated by the determination system of the both internal systems FCB1.

The visualization display of the in-vehicle system FCB1 is a process of displaying various types of information. The visualization display of the in-vehicle system FCB1 is implemented by the functions of the display unit 11, the generation unit 136, and the like of the moving body device 100. The visualization display of the in-vehicle system FCB1 displays information of the sensor unit, and the artificial intelligence. The visualization display of the in-vehicle system FCB1 displays basis information indicating a determination basis of the artificial intelligence. For example, the visualization display of the in-vehicle system FCB1 generates and displays the basis information based on the information of the artificial intelligence.

The log storage of the in-vehicle system FCB1 is a process of storing various types of information as logs. The log storage of the in-vehicle system FCB1 is implemented by the function of the storage unit 12 or the like of the moving body device 100. In the log storage of the in-vehicle system FCB1, the visualization display of the in-vehicle system FCB1 and the information of the determination system are stored as logs. The log storage of the in-vehicle system FCB1 stores sensor information and information of external environment recognition, prediction, and action planning based on the sensor information in association with each other as logs.

The emergency manual driving of the in-vehicle system FCB1 is a process of performing control according to manual driving by a user (occupant) who rides on the vehicle on which the in-vehicle system FCB1 is mounted. The emergency manual driving of the in-vehicle system FCB1 is implemented by a configuration that receives various driving operations by the user such as a bundle unit, an accelerator unit, and a brake unit of the moving body device 100. For example, when control by the emergency manual driving of the in-vehicle system FCB1 is performed, the control is stopped by the automatic driving control unit, and the traveling or the like of the vehicle on which the in-vehicle system FCB1 is mounted is controlled according to the manual driving by the user.

The in-vehicle system FCB1 as described above visualizes any basis on which deep learning called a black box has performed a determination in the automatic driving by the AI. As illustrated in FIG. 10, an artificial intelligence unit in the in-vehicle system FCB1 includes the cognitive system and the determination system. The cognitive system performs the external environment recognition and prediction, and provides information serving as a basis for the determination system. In the cognitive system, an image serving as the determination basis is highlighted on a heat map, whereby the visualization display can be performed. When a driver of the vehicle can view the visualization display and avoid an accident by switching from the automatic driving to the emergency manual driving when sensing a dangerous state. In addition, if an accident occurs, it is possible to get elucidation from the visualization display of the determination basis stored in the log and a sensor image.

With the in-vehicle system FCB1 as described above, it is possible to visualize what kind of determination has been performed by the artificial intelligence in the automatic driving. The driver can know the determination basis of the artificial intelligence, called a black box, in real time, and driving assistance for safe traveling is possible. For example, in a case where the automatic driving suddenly tries to turn left, it is possible to know a basis thereof is to avoid a person or to avoid an obstacle by the technique of visualizing the determination basis of the deep learning. For example, there is a possibility that an object such as a person exists ahead in the sudden direction change to the left. If a vehicle proceeds toward the obstacle without turning a steering wheel to the left by the automatic driving, only an accident resulting in property damage occurs, and it is also possible to avoid an accident resulting in injury or death. In addition, if an accident occurs, it is possible to prove the negligence in the automatic driving since the determination basis in the automatic driving is recorded.

2. Other Embodiments

The processing according to the respective embodiments described above may be performed in various different forms (modifications) other than the respective embodiments described above. For example, the example in which the information processing device that performs the information processing is the moving body device 100 has been described in the above-described example, but the information processing device may be a server device. For example, the information processing device may be the server device that generates basis information using information received from another device. That is, the information processing device may have only a configuration necessary to perform a process of generating basis information. An information processing system including the information processing device that generates basis information may be configured. In this case, the information processing system may include the information processing device that generates basis information and a display device that displays the basis information generated by the information processing device. That is, the information processing system may include the device that generates the basis information and the device that displays the basis information.

2-1. Other Configuration Examples

Figure 11:
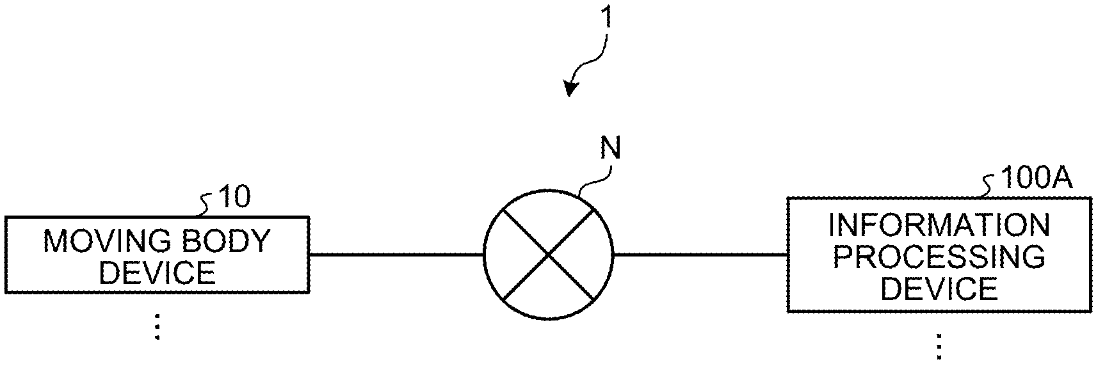
FIG. 11 is a diagram illustrating a configuration example of an information processing system according to a modification of the present disclosure.

In addition, the case where the information processing device and the moving body device (mobile body) are integrated has been described in the above-described example, but the information processing device and the moving body device (mobile body) may be separate bodies. This point will be described with reference to FIGS. 11 and 12. FIG. 11 is a diagram illustrating a configuration example of an information processing system according to a modification of the present disclosure. FIG. 12 is a diagram illustrating a configuration example of an information processing device according to a modification of the present disclosure.

As illustrated in FIG. 11, an information processing system 1 includes a moving body device 10 and the information processing device 100A. The moving body device 10 and the information processing device 100A are connected in a wired or wireless manner via the network N to be capable of communicating with each other. Note that the information processing system 1 illustrated in FIG. 11 may include a plurality of the moving body devices 10 and a plurality of the information processing devices 100A. In this case, the information processing device 100A may communicate with the moving body device 10 via the network N, and give an instruction on control of the moving body device 10 based on information collected by the moving body device 10 and various sensors. The information processing device 100A may be arranged at any place. For example, the information processing device 100A may be arranged outside the moving body device 10 or may be mounted on the moving body device 10.

The moving body device 10 is an automobile that travels by automatic driving. The moving body device 10 transmits sensor information detected by a sensor such as an image sensor to the information processing device 100A. The moving body device 10 transmits an image captured by the image sensor to the information processing device 300A. As a result, the information processing device 100A acquires the image captured by the image sensor. Note that the moving body device 10 may be any device as long as the device can transmit and receive information to and from the information processing device 100A, and may be, for example, various moving bodies such as an autonomous mobile robot and a drone.

The information processing device 100A is an information processing device that performs various types of information processing using information received from the moving body device 10. The information processing device 100A provides the moving body device 10 with information for the control of the moving body device 10, such as information on an action plan. The moving body device 10 that has received the information on the action plan from the information processing device 100A performs control to move based on the information on the action plan. The information processing device 100A provides generated basis information to the moving body device 10. The moving body device 10 that has received the basis information from the information processing device 100A displays the basis information.

As illustrated in FIG. 12, the information processing device 100A includes the storage unit 12, a control unit 13A, and a communication unit 16. The communication unit 16 is connected to the network N (the Internet or the like) in a wired or wireless manner, and transmits and receives information to and from the moving body device 10 via the network N. The storage unit 12 stores information for controlling the movement of the moving body device 10, various types of information received from the moving body device 30, and various types of information to be transmitted to the moving body device 10. In this manner, the information processing device 100A has the configuration for transmitting and receiving the information to and from an external device such as the moving body device 10.

As illustrated in FIG. 12, the information processing device 100A does not necessarily include a sensor unit, a drive unit, and the like, and does not necessarily have a configuration for implementing the function as the moving body device. Note that the information processing device 100A may include an input unit (for example, a keyboard, a mouse, or the like) that receives various operations from an administrator or the like who manages the information processing device 100A, and a display unit (for example, a liquid crystal display or the like) configured to display various types of information.

The control unit 13A includes the acquisition unit 131, the recognition unit 132, the prediction unit 133, the action planning unit 134, the execution unit 135, the generation unit 136, and a transmission unit 137.

The transmission unit 137 transmits various types of information. The transmission unit 137 provides various types of information. The transmission unit 137 provides various types of information to an external information processing device. The transmission unit 137 transmits various types of information to an external information processing device. The transmission unit 137 transmits information stored in the storage unit 12. The transmission unit 137 transmits information generated by the generation unit 136.

The transmission unit 137 transmits information to the moving body device 10. The transmission unit 137 transmits information on an action plan generated by the action planning unit 134 to the moving body device 10. The transmission unit 137 transmits the information on the action plan generated by the action planning unit 134 to the moving body device 10, thereby controlling an operation of the moving body device 10. The transmission unit 137 controls automatic driving of the moving body device 10 by transmitting the information on the action plan to the moving body device 10.

[2-2. Configuration of Moving Body]

Figure 13:
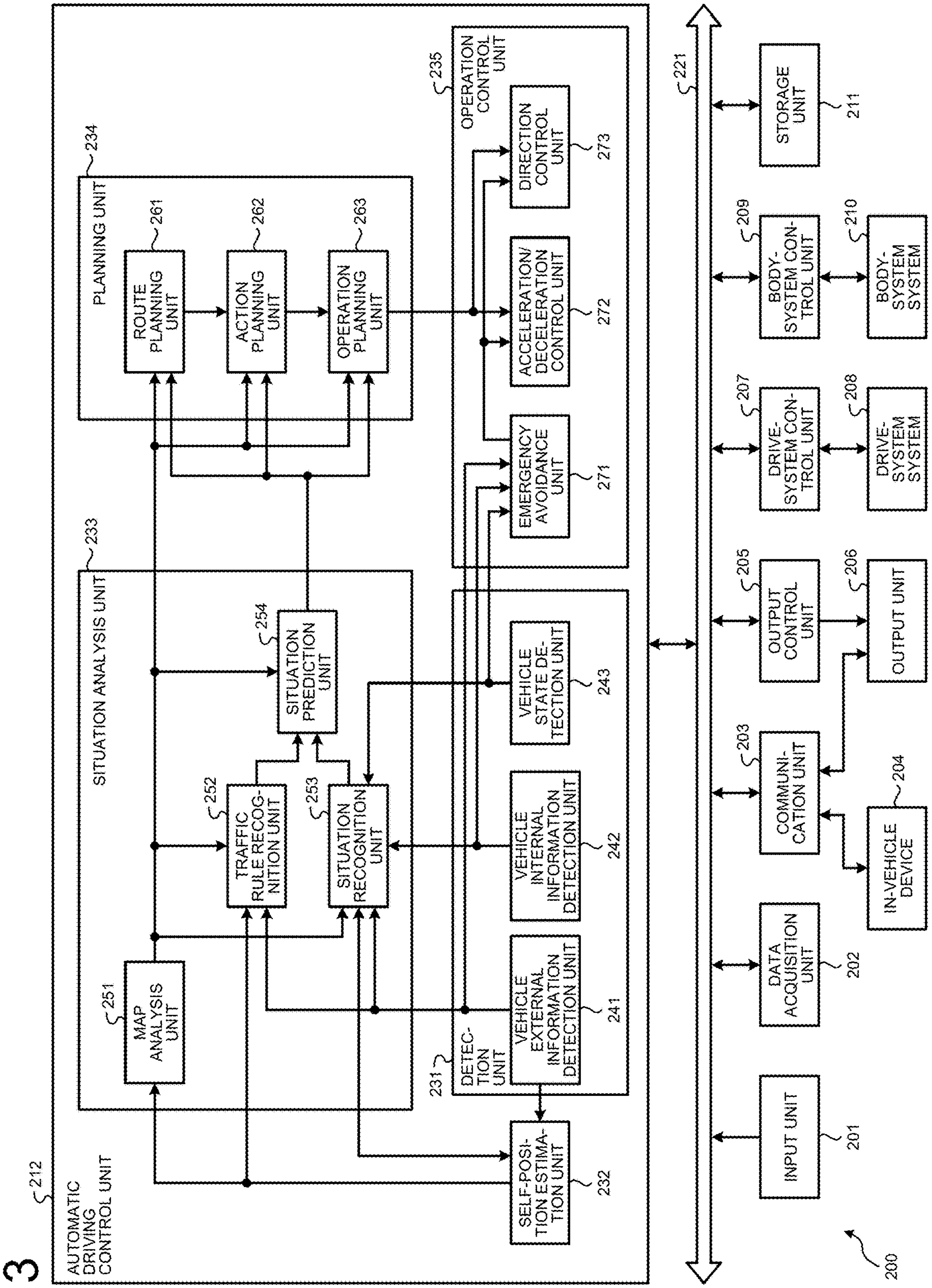
FIG. 13 is a block diagram illustrating a configuration example of schematic functions of a moving body control system to which the present technology can be applied.

In addition, the moving body device 100 and the information processing system 1 described above may have a configuration as illustrated in FIG. 13. For example, the moving body device 100 may have the following configuration in addition to the configuration illustrated in FIG. 3. Note that each unit to be described below may be included in the configuration illustrated in FIG. 3, for example.

That is, the moving body device 100 and the information processing system 1 described above can also be configured as a moving body control system to be described below. FIG. 13 is a block diagram illustrating a configuration example of schematic functions of the moving body control system to which the present technology can be applied.

An automatic driving control unit 212 and an operation control unit 235 of a vehicle control system 200, which is an example of the moving body control system, correspond to the execution unit 135 of the moving body device 100. In addition, a detection unit 231, a self-position estimation unit 232, and a situation analysis unit 233 of the automatic driving control unit 212 correspond to the recognition unit 132 and the prediction unit 133 of the moving body device 100. In addition, a planning unit 234 of the automatic driving control unit 212 corresponds to the action planning unit 134 of the moving body device 100. In addition, the automatic driving control unit 212 may have blocks corresponding to the respective processors of the control unit 13 in addition to the blocks illustrated in FIG. 13.

Note that, in a case where a vehicle provided with the vehicle control system 200 is distinguished from other vehicles, the vehicle is referred to as the host vehicle or the own vehicle hereinafter.

The vehicle control system 200 includes an input unit 201, a data acquisition unit 202, a communication unit 203, an in-vehicle device 204, an output control unit 205, an output unit 206, a drive-system control unit 207, a drive-system system 208, a body-system control unit 209, a body-system system 210, a storage unit 211, and the automatic driving control unit 212. The input unit 201, the data acquisition unit 202, the communication unit 203, the output control unit 205, the drive-system control unit 207, the body-system control unit 209, the storage unit 211, and the automatic driving control unit 212 are connected to each other via a communication network 221. The communication network 221 includes, for example, an on-vehicle communication network, a bus, and the like conforming to an arbitrary standard such as a controller area network (CAM), a local interconnect network (LIN), a local area network (LAN), and FlexRay (registered trademark). Note that each unit of the vehicle control system 200 may be directly connected without the communication network 221.

Note that, the description of the communication network 221 will be omitted hereinafter in a case where each unit of the vehicle control system 200 performs communication via the communication network 221. For example, when the input unit 201 and the automatic driving control unit 212 perform communication via the communication network 221, it is simply described that the input unit 201 and the automatic driving control unit 212 perform communication.

The input unit 201 includes a device to be used by an occupant for inputting various types of data, instructions, and the like. For example, the input unit 201 includes an operation device such as a touch panel, a button, a microphone, a switch, and a lever and an operation device that can be input by a method other than the manual operation using a voice, a gesture, or the like. In addition, for example, the input unit 201 may be a remote control device using infrared rays or other radio waves, or an external connection device such as a mobile device or a wearable device supporting an operation of the vehicle control system 200. The input unit 201 generates an input signal based on data, an instruction, or the like input by the occupant, and supplies the input signal to each unit of the vehicle control system 200.

The data acquisition unit 202 includes various sensors or the like that acquire data used for processing of the vehicle control system 200, and supplies the acquired data to each unit of the vehicle control system 200.

For example, the data acquisition unit 202 includes various sensors configured to detect a state or the like of the host vehicle. Specifically, for example, the data acquisition unit 202 includes a gyro sensor, an acceleration sensor, an inertial measurement unit (IMU), and a sensor for detecting an operation amount of an accelerator pedal, an operation amount of a brake pedal, a steering angle of a steering wheel, an engine speed, a motor speed, a wheel rotation speed, or the like.

In addition, for example, the data acquisition unit 202 includes various sensors configured to detect information outside the host vehicle. Specifically, for example, the data acquisition unit 202 includes an imaging device such as a time of flight (ToF) camera, a stereo camera, a monocular camera, an infrared camera, and other cameras. In addition, for example, the data acquisition unit 202 includes an environment sensor configured to detect climate, weather, and the like, and a surrounding information detection sensor configured to detect an object around the host vehicle. Examples of the environment sensor include a raindrop sensor, a fog sensor, a sunlight sensor, a snow sensor, and the like. Examples of the surrounding information detection sensor include an ultrasonic sensor, a radar, light detection and ranging or laser imaging detection and ranging (LiDAR), a sonar, and the like.

Further, for example, the data acquisition unit 202 includes various sensors configured to detect a current position of the host vehicle. Specifically, for example, the data acquisition unit 202 includes a global navigation satellite system (GNSS) receiver or the like that receives a GNSS signal from a GNSS satellite.

In addition, for example, the data acquisition unit 202 includes various sensors configured to detect information inside the vehicle. Specifically, for example, the data acquisition unit 202 includes an imaging device that captures an image of a driver, a biometric sensor that detects biometric information of the driver, a microphone that collects a voice in the vehicle interior, and the like. The biometric sensor is provided, for example, on a seat, surface, a steering wheel, or the like, and detects biometric information of the occupant sitting on the seat or a driver gripping the steering wheel.

The communication unit 203 performs communication with the in-vehicle device 204, various devices outside the vehicle, a server, a base station, and the like to transmit data supplied from each unit of the vehicle control system 200 and supplies received data to each unit of the vehicle control system 200. Note that a communication protocol supported by the communication unit 203 is not particularly limited, and the communication unit 203 can support a plurality of types of communication protocols.

For example, the communication unit 203 performs wireless communication with the in-vehicle device 204 by a wireless LAN, Bluetooth (registered trademark), near field communication (NFC), a wireless USB (WUSB), or the like. In addition, for example, the communication unit 203 performs wired communication with the in-vehicle device 204 by a universal serial bus (USB), a high-definition multimedia interface (HDMI) (registered trademark), a mobile high-definition link (MHL), or the like via a connection terminal (and a cable if necessary) (not illustrated).

Further, for example, the communication unit 203 performs communication with a device (for example, an application server or a control server) existing on an external network (for example, the Internet, a cloud network, or a company-specific network) via a base station or an access point. In addition, for example, the communication unit 203 performs communication with a terminal (for example, a terminal of a pedestrian or a store, or a machine type communication (MTC) terminal) existing in the vicinity of the host vehicle using the peer to peer (P2P) technology. Further, for example, the communication unit 203 performs V2X communication such as vehicle to vehicle communication, vehicle to infrastructure communication, vehicle to home communication, and vehicle to pedestrian communication. In addition, for example, the communication unit 203 includes a beacon reception unit, receives radio waves or electromagnetic waves transmitted from a wireless station or the like installed on a road, and acquires information such as a current position, congestion, a traffic restriction, and a required time.

Examples of the in-vehicle device 204 include a mobile device or a wearable device possessed by the occupant, an information device carried in or attached to the host vehicle, a navigation device that searches for a route to an arbitrary destination, and the like.

The output control unit 205 controls an output of various types of information to the occupant of the host vehicle or the outside of the vehicle. For example, the output control unit 205 generates an output signal including at least one of visual information (for example, image data) and auditory information (for example, voice data) and supplying the output signal to the output unit 206, thereby controlling the output of the visual information and the auditory information from the output unit 206. Specifically, for example, the output control unit 205 combines pieces of image data captured by different imaging devices of the data acquisition unit 202 to generate a bird's eye image, a panoramic image, or the like, and supplies the output signal including the generated image to the output unit 206. In addition, for example, the output control unit 205 generates voice data including a warning sound, a warning message, or the like for danger such as a collision, contact, or entry into a danger zone, and supplies the output signal including the generated voice data to the output unit 206.

The output unit 206 includes a device capable of outputting the visual information or the auditory information to the occupant of the host vehicle or the outside of the vehicle. For example, the output unit 206 includes a display device, an instrument panel, an audio speaker, a headphone, a wearable device such as a glasses-type display worn by the occupant, a projector, a lamp, and the like. The display device included in the output unit 206 may be a device that displays the visual information in the field of view of the driver, such as a head-up display, a transparent display, or a device having an augmented reality (AR) display function, in addition to a device having a typical display.

The drive-system control unit 207 generates various control signals and supplies the control signals to the drive-system system 208 to control the drive-system system 208. In addition, the drive-system control unit 207 supplies a control signal to each unit other than the drive-system system 208 as necessary, and performs notification of a control state of the drive-system system 208 and the like.

The drive-system system 208 includes various devices related to a drive system of the host vehicle. For example, the drive-system system 208 includes a driving force generation device configured to generate a driving force such as an internal combustion engine and a driving motor, a driving force transmission mechanism for transmitting the driving force to wheels, a steering mechanism that adjusts a steering angle, a braking device that generates a braking force, an antilock brake system (ABS), electronic stability control (ESC), an electric power steering device, and the like.

The body-system control unit 209 generates various control signals and supplies the control signals to the body-system system 210 to control the body-system system 210. In addition, the body-system control unit 209 supplies a control signal to each unit other than the body-system system 210 as necessary, and performs notification of a control state of the body-system system 210 and the like.

The body-system system 210 includes various devices of a body system installed on a vehicle body. For example, the body-system system 210 includes a keyless entry system, a smart key system, a power window device, a power seat, a steering wheel, an air conditioner, and various lamps (for example, a head lamp, a back lamp, a brake lamp, an indicator, a fog lamp, and the like).

Examples of the storage unit 211 include a read only memory (ROM), a random access memory (RAM), a magnetic storage device such as a hard disc drive (HDD), a semiconductor storage device, an optical storage device, a magneto-optical storage device, and the like. The storage unit 211 stores various programs, data, and the like to be used by each unit of the vehicle control system 200. For example, the storage unit 211 stores map data such as a three-dimensional high-precision map such as a dynamic map, a global map that covers a wide area with a lower precision than the high-precision map, and a local map including information around the host vehicle.

The automatic driving control unit 212 performs control related to automatic driving such as autonomous traveling and driving assistance. Specifically, for example, the automatic driving control unit 212 performs cooperative control for the purpose of implementing a function of an advanced driver assistance system (ADAS) including collision avoidance or impact mitigation for the host vehicle, travel following a vehicle ahead based on an inter-vehicle distance, constant speed travel, a warning for a collision of the host vehicle, a warning for the host vehicle deviating a lane, or the like. In addition, for example, the automatic driving control unit 212 performs cooperative control for the purpose of the automatic driving or the like to travel autonomously without depending on the operation of the driver. The automatic driving control unit 212 includes the detection unit 231, the self-position estimation unit 232, the situation analysis unit 233, the planning unit 234, and the operation control unit 235.

The detection unit 231 detects various types of information necessary for control of the automatic driving. The detection unit 231 includes a vehicle external information detection unit 241, a vehicle internal information detection unit 242, and a vehicle state detection unit 243.

The vehicle external information detection unit 241 performs a process of detecting information outside the host vehicle based on data or a signal from each unit of the vehicle control system 200. For example, the vehicle external information detection unit 241 performs detection processing, recognition processing, and tracking processing for an object around the host vehicle, and a process of detecting a distance to the object. Examples of the object to be detected include a vehicle, a person, an obstacle, a structure, a road, a traffic light, a traffic sign, a read sign, and the like. In addition, for example, the vehicle external information detection unit 241 performs a process of detecting the surrounding environment of the host, vehicle. Examples of the surrounding environment to be detected include climate, temperature, humidity, brightness, a state of a road surface, and the like. The vehicle external information detection unit 241 supplies data indicating a result of the detection process to the self-position estimation unit 232, a map analysis unit 251, a traffic rule recognition unit 252, and a situation recognition unit 253 of the situation analysis unit 233, and an emergency avoidance unit 271 of the operation control unit 235.

The vehicle internal information detection unit 242 performs a process of detecting information inside the vehicle based on data or a signal from each unit of the vehicle control system 200. For example, the vehicle internal information detection unit 242 performs authentication processing and recognition processing for the driver, a process of detecting a state of the driver, a process of detecting the occupant, a process of detecting an environment inside the vehicle, and the like. Examples of the state of the driver to be detected include a physical condition, an alertness level, a concentration level, a fatigue level, a line-of-sight direction, and the like. Examples of the environment inside the vehicle to be detected include temperature, humidity, brightness, an odor, and the like. The vehicle internal information detection unit 242 supplies data indicating a result of the detection process to the situation recognition unit 253 of the situation analysis unit 233, the emergency avoidance unit 271 of the operation control unit 235, and the like.

The vehicle state detection unit 243 performs a process of detecting a state of the host vehicle based on data or a signal from each unit of the vehicle control system 200. Examples of the state of the host vehicle to be detected include a speed, an acceleration, a steering angle, presence or absence and a content of an abnormality, a state of a driving operation, a position and an inclination of a power seat, a state of a door lock, states of other on-vehicle devices, and the like. The vehicle state detection unit 243 supplies data indicating a result of the detection process to the situation recognition unit 253 of the situation analysis unit 233, the emergency avoidance unit 271 of the operation control unit 235, and the like.

The self-position estimation unit 232 performs a process of estimating a position, a posture, and the like of the host vehicle based on data or a signal from each unit of the vehicle control system 200 such as the vehicle external information detection unit 241 and the situation recognition unit 253 of the situation analysis unit 233. In addition, the self-position estimation unit 232 generates a local map (hereinafter, referred to as a self-position estimation map) to be used for estimation of the self-position as necessary. The self-position estimation map is, for example, a highly precise map using a technique such as simultaneous localization and mapping (SLAM). The self-position estimation unit 232 supplies data indicating a result of the estimation process to the nap analysis unit 251, the traffic rule recognition unit 252, the situation recognition unit 253, and the like of the situation analysis unit 233. In addition, the self-position estimation unit 232 stores the self-position estimation map in the storage unit 211.

The situation analysis unit 233 performs a process of analyzing situations of the host vehicle and the surroundings. The situation analysis unit 233 includes the map analysis unit 253, the traffic rule recognition unit 252, the situation recognition unit 253, and a situation prediction unit 254.

The map analysis unit 251 performs a process of analyzing various maps stored in the storage unit 211 while using data or a signal from each unit of the vehicle control system 200 such as the self-position estimation unit 232 and the vehicle external information detection unit 241 as necessary, and constructs a map including information necessary for processing of the automatic driving. The map analysis unit 251 supplies the constructed map to the traffic rule recognition unit 252, the situation recognition unit 253, the situation prediction unit 254, and a route planning unit 261, an action planning unit 262, an operation planning unit 263, and the like of the planning unit 234.

The traffic rule recognition unit 252 performs a process of recognizing a traffic rule around the host vehicle based on data or a signal from each unit of the vehicle control system 200 such as the self-position estimation unit 232, the vehicle external information detection unit 241, and the map analysis unit 251. With this recognition process, for example, a position and a state of a signal around the host vehicle, a content of a traffic regulation around the host vehicle, a travelable lane, and the like are recognized. The traffic rule recognition unit 252 supplies data indicating a result of the recognition process to the situation prediction unit 254 and the like.

The situation recognition unit 253 performs a process of recognizing a situation related to the host vehicle based on data or a signal from each unit of the vehicle control system 200 such as the self-position estimation unit 232, the vehicle external information detection unit 241, the vehicle internal information detection unit 242, the vehicle state detection unit 243, and the map analysis unit 251. For example, the situation recognition unit 253 performs a process of recognizing of a situation of the host vehicle, a situation around the host vehicle, a situation of the driver of the host vehicle, and the like. In addition, the situation recognition unit 253 generates a local map (hereinafter, referred to as a situation recognition map) to be used to recognize the situation around the host vehicle as necessary. The situation recognition map is, for example, an occupancy grid map.

Examples of the situation of the host vehicle to be recognized include a position, a posture, and movement (for example, a speed, an acceleration, movement direction, and the like) of the host vehicle, and the presence or absence and a content of an abnormality. Examples of the situation around the host vehicle to be recognized include a type and a position of a surrounding stationary object, a type, a position, and a movement (for example, speed, acceleration, movement direction, and the like) of a surrounding moving object, a configuration of a surrounding road and a state of a road surface, and surrounding climate, temperature, humidity, brightness, and the like. Examples of the state of the driver to be recognized Include a physical condition, an alertness level, a concentration level, a fatigue level, movement of a line of sight, a driving operation, and the like.

The situation recognition unit 253 supplies data (including the situation recognition map as necessary) indicating a result of the recognition process to the self-position estimation unit 232, the situation prediction unit. 254, and the like. In addition, the situation recognition unit 253 stores the situation recognition map in the storage unit 211.

The situation prediction unit 254 performs a process of predicting a situation related to the host vehicle based on data or a signal from each unit of the vehicle control system 200 such as the map analysis unit 251, the traffic rule recognition unit 252, and the situation recognition unit 253. For example, the situation prediction unit 254 performs a process of predicting a situation of the host vehicle, a situation around the host vehicle, a situation of the driver, and the like.

Examples of the situation of the host vehicle to be predicted include a behavior of the host vehicle, occurrence of an abnormality, a travelable distance, and the like. Examples of the situation around the host vehicle to be predicted include a behavior of a moving object around the host vehicle, a change in a signal state, a change in an environment such as climate, and the like. Examples of the situation of the driver to be predicted include a behavior and a physical condition of the driver.

The situation prediction unit 254 supplies data indicating a result of the prediction process to the route planning unit 261, the action planning unit 262, the operation planning unit 263, and the like of the planning unit 234 together with the data from the traffic rule recognition unit 252 and the situation recognition unit 253.

The route planning unit 261 plans a route to a destination based on data or a signal from each unit of the vehicle control system 200 such as the map analysis unit 251 and the situation prediction unit 254. For example, the route planning unit 261 sets a route from a current position to a designated destination based on a global map. In addition, for example, the route planning unit 261 appropriately changes the route based on a situation such as congestion, an accident, a traffic restriction, and construction, a physical condition of the driver, and the like. The route planning unit 261 supplies data indicating the planned route to the action planning unit 262 and the like.

The action planning unit 262 plans an action of the host vehicle for safely traveling the route planned by the route planning unit 261 within a planned time based on data or a signal from each unit of the vehicle control system 200 such as the map analysis unit 251 and the situation prediction unit 254. For example, the action planning unit 262 plans start, stop, a proceeding direction (for example, forward movement, backward movement, left turn, right turn, a direction change, and the like), a traveling lane, a traveling speed, overtaking, and the like. The action planning unit 262 supplies data indicating the planned action of the host vehicle to the operation planning unit 263 and the like.

The operation planning unit 263 plans an operation of the host vehicle to implement the action planned by the action planning unit 262 based on data or a signal from each unit of the vehicle control system 200 such as the map analysis unit 251 and the situation prediction unit 254. For example, the operation planning unit 263 plans acceleration, deceleration, a travel trajectory, and the like. The operation planning unit 263 supplies data indicating the planned operation of the host vehicle to an acceleration/deceleration control unit 212, a direction control unit 273, and the like of the operation control unit 235.

The operation control unit 235 controls an operation of the host vehicle. The operation control unit 235 includes the emergency avoidance unit 271, the acceleration/deceleration control unit 272, and the direction control unit 273.

The emergency avoidance unit 271 performs a process of detecting an emergency such as a collision, contact, entry into a danger zone, an abnormality of the driver, and an abnormality of the vehicle based on detection results of the vehicle external information detection unit 241, the vehicle internal information detection unit 242, and the vehicle state detection unit 243. When detecting the occurrence of an emergency, the emergency avoidance unit 271 plans an operation of the host vehicle to avoid the emergency such as sudden stop and sudden turn. The emergency avoidance unit 271 supplies data indicating the planned operation of the host vehicle to the acceleration/deceleration control unit 272, the direction control unit 273, and the like.

The acceleration/deceleration control unit 272 performs acceleration/deceleration control to implement the operation of the host vehicle planned by the operation planning unit 263 or the emergency avoidance unit 271. For example, the acceleration/deceleration control unit 272 calculates a control target value of the driving force generation device or the braking device configured to implement planned acceleration, deceleration, or sudden stop, and supplies a control command indicating the calculated control target value to the drive-system control unit 207.

The direction control unit 273 performs direction control to implement the operation of the host vehicle planned by the operation planning unit 263 or the emergency avoidance unit 271. For example, the direction control unit 273 calculates a control target value of the steering mechanism configured to implement the traveling trajectory or sudden turn planned by the operation planning unit 263 or the emergency avoidance unit 271, and supplies a control command indicating the calculated control target value to the drive-system control unit 207.

[2-3. Others]

In addition, among each process described in the respective embodiments described above, all or a part of the processes described as being performed automatically may be manually performed or the processes described as being performed manually can be performed automatically by the known method. In addition, the processing procedures, specific names, and information including various data and parameters illustrated in the above documents and drawings can be arbitrarily changed unless otherwise specified. For example, various types of information illustrated in each drawing are not limited to the illustrated information.

In addition, each component of each device illustrated is a functional concept, and does not necessarily need to be physically configured as illustrated. That is, the specific form of distribution/integration of each device is not limited to those illustrated in the drawings, and all or a part thereof may be functionally or physically distributed/integrated into arbitrary units according to various loads and usage situations.

In addition, the respective embodiments and modification described above can be appropriately combined within a range that does not contradict processing contents.

In addition, the effects described in the present specification are merely examples and are not restrictive of the disclosure herein, and other effects not described herein may be achieved.

Note that the present invention can also be applied to a television (TV) that provides a function such as program recommendation, a camera that provides a function such as autofocus and an automatic shutter, other home appliances, and smartphones using a machine learning model without being limited to a moving body. For example, the information processing device that implements the information processing according to the present disclosure can be applied as various devices such as the above devices such as a television, a camera, other home appliances, and a smartphone without being limited to the moving body device.

3. Effects According to Present Disclosure

As described above, the information processing device (the moving body device 100 or the information processing device 100A in the embodiments) according to the present disclosure includes an acquisition unit (the acquisition unit 131 in the embodiments) and a generation unit (the generation unit 136 in the embodiments). The acquisition unit acquires a model having a structure of a neural network and input information input to the model. The generation unit generates basis information indicating a basis for an output of the model after input information is input to the model based on state information indicating a state of the model after the input of the input information to the model.

As a result, the information processing device according to the present disclosure can indicate the basis for the output of the model when the input information is input to the model having the structure of the neural network, and can enable elucidation of the basis for the output of the model having the structure of the neural network. That is, the information processing device can enable elucidation of a basis for processing performed by the information processing device.

In addition, the generation unit generates the basis information indicating the basis of processing using the output of the model. As a result, the information processing device can indicate the basis for the output of the model using the output of the model, and can enable elucidation of the basis for the processing performed by the information processing device.

In addition, the acquisition unit acquires a model to be used for control of a device that autonomously acts. The generation unit generates basis information indicating a basis for the control of the device after input information is input to the model. As a result, the information processing device can indicate a basis for an output of the model in the control of the device that autonomously acts, and can enable elucidation of the basis for the processing performed by the information processing device.

In addition, the acquisition unit acquires a model to be used for control of a moving body that is autonomously movable. The generation unit generates basis information indicating a basis for the control of the moving body after input information is input to the model. As a result, the information processing device can indicate a basis for an output of the model in the control of the moving body that is autonomously movable, and can enable elucidation of the basis for the processing performed by the information processing device.

In addition, the generation unit acquires a model to be used for control of a moving body which is a vehicle operated by automatic driving. Therefore, the information processing device can indicate a basis for an output of the model in the control of the vehicle operated by the automatic driving, and can enable elucidation of the basis for the processing performed by the information processing device.

In addition, the generation unit generates basis information indicating a basis of a movement direction of the moving body. As a result, the information processing device can indicate the basis of the movement direction of the moving body, and can enable elucidation of the basis for the processing performed by the information processing device.

In addition, the acquisition unit acquires a model, which performs an output in response to an input of sensor information, and input information which is the sensor information detected by a sensor. The generation unit generates basis information of the model to which the input information has been input in response to detection by the sensor. As a result, the information processing device can indicate a basis for an output of the model when the sensor information is input to the model having the structure of the neural network, and can enable elucidation of the basis for the processing performed by the information processing device.

In addition, the acquisition unit acquires a model, which outputs a recognition result of image information in response to an input of the image information, and input information which is the image information. As a result, the information processing device can indicate a basis for an output of the model when the image information is input to the model having the structure of the neural network, and can enable elucidation of the basis for the processing performed by the information processing device.

In addition, the generation unit generates image information indicating a basis for an output of a model as the basis information. As a result, the information processing device can enable elucidation of the basis for the processing performed by the information processing device by generating the image information indicating the basis for the output of the model.

In addition, the generation unit generates a heat map indicating a basis for an output of a model as the basis information. As a result, the information processing device can enable elucidation of the basis for the processing performed by the information processing device by generating the heat map indicating the basis for the output of the model.

In addition, the acquisition unit acquires a model including a CNN. As a result, the information processing device can indicate the basis for the output of the model including the CNN, and can enable elucidation of the basis for the processing performed by the information processing device.

In addition, the generation unit generates basis information based on state information including a state of a convolutional layer of a model. As a result, the information processing device can indicate the basis for the output of the model based on the state of the convolution layer of the model, and can enable elucidation of the basis for the processing performed by the information processing device.

In addition, the generation unit generates basis information by Grad-CAM. As a result, the information processing device can indicate the basis for the output of the model by the Grad-CAM technique, and can enable elucidation of the basis for the processing performed by the information processing device.

In addition, the acquisition unit acquires a model, which performs an output in response to an input of output information output from another model, and input information which is the output information output from the another model. The generation unit generates basis information of the model to which the input information has been input in response to the output of the another model. As a result, the information processing device can indicate the basis for the output of the model using the output of the another model as the input, and can enable elucidation of the basis for the processing performed by the information processing device.

In addition, the basis information is generated based on state information including an output result of a model after input information is input to the model. As a result, the information processing device can indicate the basis for the output of the model using the output of the model based on the output result of the model, and can enable elucidation of the basis for the processing performed by the information processing device.

In addition, the generation unit generates basis information by processing related to LIME. As a result, the information processing device can indicate the basis for the output of the model by the LIME technique, and can enable elucidation of the basis for the processing performed by the information processing device.

In addition, the information processing device includes a display unit (the display unit 11 in the embodiments). The display unit displays the basis information. As a result, the information processing device can provide appropriate information regarding the basis for the output of the model.

In addition, the generation unit stores log information in which input information and basis information are associated with each other in the storage unit. As a result, the information processing device can manage an input and a basis for an output thereof in association with each other, so that the information processing device can appropriately provide the information indicating the basis for the output at the time point for the input.

In addition, the information processing device is an information processing device that performs an action using a machine learning model, includes a sensor unit (the sensor unit 14 in the embodiments) and a basis information generation unit (the basis information generation unit RSD1 in the embodiments) including a plurality of basis generation algorithms for generating basis information of the action, and outputs information indicating the basis of the action based on basis information generated based on one or the plurality of basis generation algorithms and/or sensor information. As a result, the information processing device can indicate the basis of the action of the information processing device by outputting the information indicating the basis of the action based on the basis information generated based on the basis generation algorithm and/or the sensor information. Therefore, the information processing device can explain the basis for the processing performed by the information processing device.

4. Hardware Configuration

Figure 14:
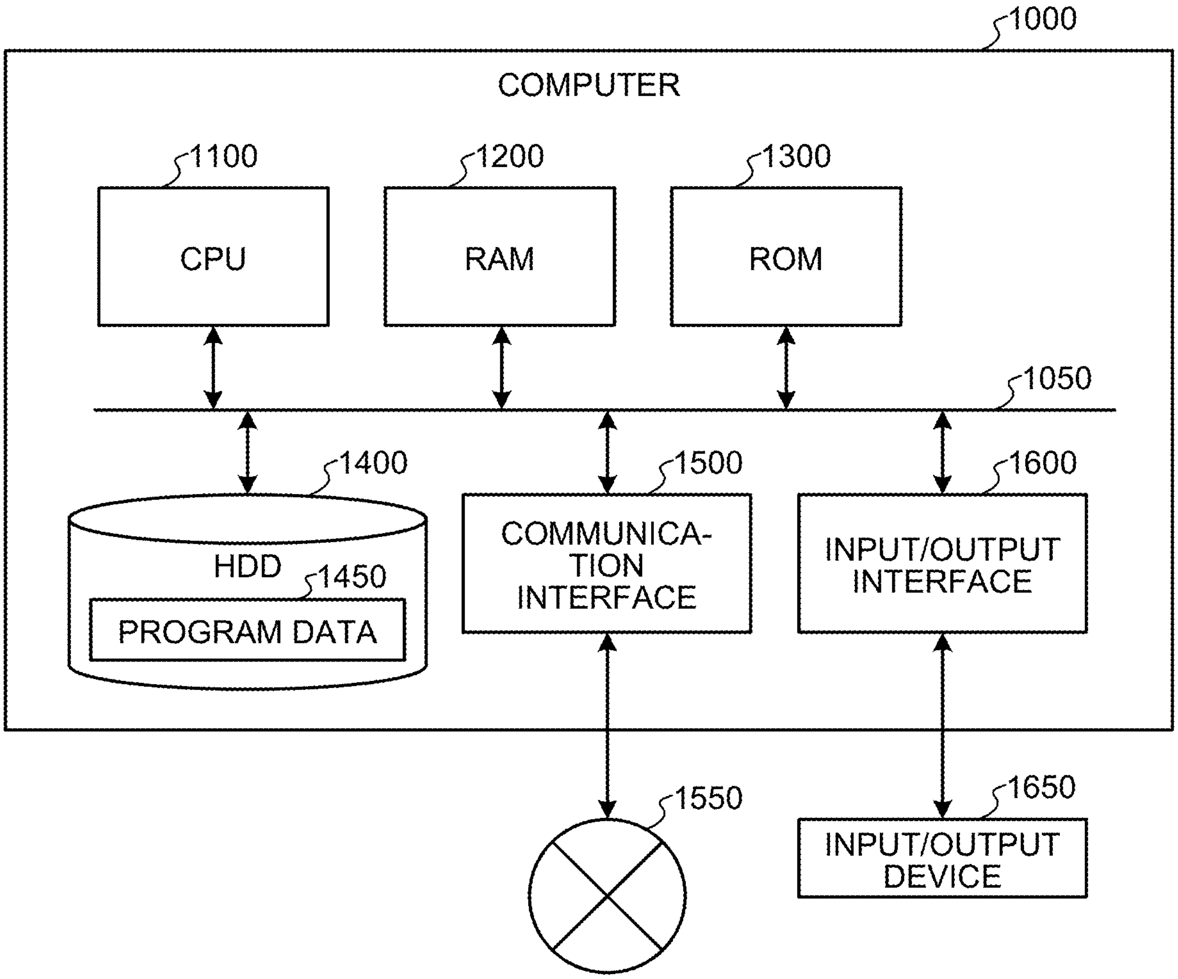
FIG. 14 is a hardware configuration diagram illustrating an example of a computer that implements functions of the moving body device or the information processing device.

Information devices, such as the moving body device 100 and the information processing device 100A according to the respective embodiments described above, are realized by a computer 1000 having a configuration as illustrated in FIG. 14, for example. FIG. 14 is a hardware configuration diagram illustrating an example of a computer 1000 that implements functions of an information processing device such as the moving body device 100 and the information processing device 100A. Hereinafter, the moving body device 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 is operated based on a program stored in the ROM 1300 or the HDD 1400, and controls each unit. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program depending on hardware of the computer 1000, and the like.

The HDD 1400 is a computer-readable recording medium that non-temporarily records a program executed by the CPU 1100, data used by the program, and the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to the other devices via the communication interface 1500.

The input/output interface 1600 is an interface for connection between an input/output device 1650 and the computer 1000. For example, the CPU 1100 receives data from an input device such as a keyboard or a mouse via the input/output interface 1600. Further, the CPU 1100 transmits data to an output device such as a display, a speaker, or a printer via the input/output interface 1600. Further, the input/output interface 1600 may function as a media interface for reading a program or the like recorded on predetermined recording media. The media are, for example, optical recording media such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the moving body device 100 according to the embodiment, the CPU 1100 of the computer 1000 implements the functions of the control unit 13 and the like by executing the information processing program loaded on the RAM 1200. Further, the HDD 1400 stores the information processing program according to the present disclosure or data in the storage unit 12. Note that the CPU 1100 reads and executes the program data 1450 from the HDD 1400, but as another example, the CPU 1100 may acquire these programs from other devices via the external network 1550.

Note that the present technology can also have the following configurations.

(1)

An information processing device comprising:

an acquisition unit that acquires a model having a structure of a neural network and input information input to the model; and a generation unit that generates basis information indicating a basis for an output of the model after the input information is input to the model based on state information indicating a state of the model after the input of the input information to the model.

(2)

The information processing device according to (1), wherein the generation unit generates the basis information indicating a basis of processing using an output of the model.

(3)

The information processing device according to (1) or (2), wherein the acquisition unit acquires the model to be used for control of a device that autonomously acts, and the generation unit generates the basis information indicating a basis of the control of the device after the input information is input to the model.

(4)

The information processing device according to any one of (1) to (3), wherein the acquisition unit acquires the model to be used for control of a moving body that is autonomously movable, and the generation unit generates the basis information indicating a basis of the control of the moving body after the input information is input to the model.

(5)

The information processing device according to (4), wherein the acquisition unit acquires the model to be used for the control of the moving body which is a vehicle operating by automatic driving.

(6)

The information processing device according to (4) or (5), wherein the generation unit generates the basis information indicating a basis of a movement direction of the moving body.

(7)

The information processing device according to any one of (1) to (6), wherein the acquisition unit acquires the model that performs an output in response to an input of sensor information and the input information which is the sensor information detected by a sensor, and the generation unit generates the basis information of the model to which the input information is input in response to the detection by the sensor.

(8)

The information processing device according to any one of (1) to (7), wherein the acquisition unit acquires the model that outputs a recognition result of image information in response to an input of the image information, and the input information which is the image information.

(9)

The information processing device according to any one of (1) to (8), wherein the generation unit generates image information indicating a basis for an output of the model as the basis information.

(10)

The information processing device according to (9), wherein the generation unit generates a heat map indicating a basis for an output of the model as the basis information.

(11)

The information processing device according to any one of (1) to (10), wherein the acquisition unit acquires the model including a convolutional neural network (CNN).

(12)

The information processing device according to (11), wherein the generation unit generates the basis information based on the state information including a state of a convolution layer of the model.

(13)

The information processing device according to (11) or (12), wherein the generation unit generates the basis information by processing related to class activation mapping (CAM).

(14)

The information processing device according to (13), wherein the generation unit generates the basis information by gradient-weighted class activation mapping (Grad-CAM).

(15)

The information processing device according to any one of (1) to (14), wherein the acquisition unit acquires the model that performs an output in response to an input of output information output from another model and the input information which is the output information output from the another model, and the generation unit generates the basis information of the model to which the input information is input in response to the output from the another model.

(16)

The information processing device according to any one of (1) to (15), wherein the generation unit generates the basis information based on the state information including an output result of the model after the input information is input to the model.

(17)

The information processing device according to the above (16), wherein the generation unit generates the basis information based on a basis model learned using the input information and the output result.

(18)

The information processing device according to the above (17), wherein the generation unit generates the basis information using the basis model that is locally approximated with a combination of the input information and the output result as a target.

(19)

The information processing device according to the above (17) or (18), wherein the generation unit generates the basis information by processing related to local interpretable model-agnostic explanations (LIME).

(20)

The information processing device according to any one of the above (1) to (19), further including a display unit that displays the basis information.

(21)

The information processing device according to the above (20), wherein the display unit displays the basis information as a diagram.

(22)

The information processing device according to the above (21), wherein the display unit displays the basis information which is image information.

(23)

The information processing device according to the above (22), wherein the display unit displays the basis information which is a heat map.

(24)

The information processing device according to any one of the above (20) to (23), wherein the display unit displays the basis information as a character.

(25)

The information processing device according to any one of the above (20) to (24), wherein the display unit displays the basis information as a numerical value.

(26)

The information processing device according to any one of the above (1) to (25), wherein the generation unit stores, in a storage unit, log information in which the input information and the basis information are associated.

(27)

An information processing method for executing processing comprising:

acquiring a model having a structure of a neural network and input information input to the model; and generating basis information indicating a basis for an output of the model after the input information is input to the model based on state information indicating a state of the model after the input of the input information to the model.

(28)

An information processing program for executing processing comprising:

acquiring a model having a structure of a neural network and input information input to the model; and generating basis information indicating a basis for an output of the model after the input information is input to the model based on state information indicating a state of the model after the input of the input information to the model.

(29)

An information processing device that performs an action using a machine learning model, the information processing device comprising:

a sensor unit; and a basis information generation unit including a plurality of basis generation algorithms to generate basis information of the action, wherein information indicating a basis of the action is output based on the basis information generated based on one or a plurality of the basis generation algorithms and/or sensor information.

REFERENCE SIGNS LIST

100 MOVING BODY DEVICE
100A INFORMATION PROCESSING DEVICE
11 DISPLAY UNIT
12 STORAGE UNIT
121 MODEL INFORMATION STORAGE UNIT
122 LOG INFORMATION STORAGE UNIT
13, 13A CONTROL UNIT
131 ACQUISITION UNIT
132 RECOGNITION UNIT
133 PREDICTION UNIT
134 ACTION PLANNING UNIT
135 EXECUTION UNIT
136 GENERATION UNIT
137 TRANSMISSION UNIT
14 SENSOR UNIT
141 IMAGE SENSOR
15 DRIVE UNIT
16 COMMUNICATION UNIT

The invention claimed is:

1. An information processing device comprising:

processing circuitry configured to:

acquire a model having a structure of a neural network and input information input to the model;

select, during operation of a moving body, at least one basis generation algorithm from among a plurality of different basis generation algorithms that each includes a process or set of rules, the selecting including selecting, during the operation of the moving body, a first basis generation algorithm of the plurality of different basis generation algorithms based on one of (i) a processing situation and (ii) a characteristic, and selecting, during the operation of the moving body, a second basis generation algorithm of the plurality of different basis generation algorithms different from the first basis generation algorithm based on the other of (i) the processing situation and (ii) the characteristic;

generate, in real time, basis information indicating a basis for an output of the model after the input information is input to the model based on state information indicating a state of the model after the input of the input information to the model using the selected at least one basis generation algorithm; and control the operation of the moving body based on the basis information.

2. The information processing device according to claim 1, wherein the processing circuitry is configured to generate the basis information so as to indicate a basis of processing using the output of the model.

3. The information processing device according to claim 1, wherein the model is for control of a device that autonomously acts, and the processing circuitry is configured to generate the basis information so as to indicate a basis of the control of the device after the input information is input to the model.

4. The information processing device according to claim 1, wherein the moving body is autonomously movable, the model is for control of the moving body, and the processing circuitry is configured to generate the basis information so as to indicate a basis of the control of the moving body after the input information is input to the model.

5. The information processing device according to claim 4, wherein the moving body is a vehicle operating by automatic driving.

6. The information processing device according to claim 4, wherein the processing circuitry is configured to generate the basis information so as to indicate a basis of a movement direction of the moving body.

7. The information processing device according to claim 1, wherein the input information is sensor information detected by a sensor, and the processing circuitry is configured to generate the basis information of the model to which the input information is input in response to the detection by the sensor.

8. The information processing device according to claim 1, wherein the input information is image information, and the model outputs a recognition result of image information in response to an input of the image information.

9. The information processing device according to claim 1, wherein the processing circuitry is configured to generate image information indicating the basis for the output of the model as the basis information.

10. The information processing device according to claim 9, wherein the basis information includes a heat map indicating the basis for the output of the model.

11. The information processing device according to claim 1, wherein the model includes a convolutional neural network (CNN).

12. The information processing device according to claim 11, wherein the state information includes a state of a convolution layer of the model.

13. The information processing device according to claim 12, wherein the processing circuitry is configured to generate the basis information by gradient-weighted class activation mapping (Grad-CAM).

14. The information processing device according to claim 1, wherein the input information is output information output from another model, the model performs an output in response to an input of the output information output from the other model, and the processing circuitry is configured to generate the basis information of the model to which the input information is input in response to the output from the other model.

15. The information processing device according to claim 1, wherein the state information includes an output result of the model after the input information is input to the model.

16. The information processing device according to claim 15, wherein the processing circuitry is configured to generate the basis information by processing related to local interpretable model-agnostic explanations (LIME).

17. The information processing device according to claim 1, wherein the processing circuitry is configured to cause the basis information to be displayed.

18. An information processing method for executing processing comprising:

acquiring a model having a structure of a neural network and input information input to the model;

selecting, during operation of a moving body, at least one basis generation algorithm from among a plurality of different basis generation algorithms that each includes a process or set of rules, the selecting including selecting, during the operation of the moving body, a first basis generation algorithm of the plurality of different basis generation algorithms based on one of (i) a processing situation and (ii) a characteristic, and selecting, during the operation of the moving body, a second basis generation algorithm of the plurality of different basis generation algorithms different from the first basis generation algorithm based on the other of (i) the processing situation and (ii) the characteristic;

generating, in real time, basis information indicating a basis for an output of the model after the input information is input to the model based on state information indicating a state of the model after the input of the input information to the model using the selected at least one basis generation algorithm; and controlling the operation of the moving body based on the basis information.

19. A non-transitory computer readable medium storing an information processing program that when executed causes processing circuitry to perform a method, the method comprising:

acquiring a model having a structure of a neural network and input information input to the model;

selecting, during operation of a moving body, at least one basis generation algorithm from among a plurality of different basis generation algorithms that each includes a process or set of rules, the selecting including selecting, during the operation of the moving body, a first basis generation algorithm of the plurality of different basis generation algorithms based on one of (i) a processing situation and (ii) a characteristic, and selecting, during the operation of the moving body, a second basis generation algorithm of the plurality of different basis generation algorithms different from the first basis generation algorithm based on the other of (i) the processing situation and (ii) the characteristic;

generating, in real time, basis information indicating a basis for an output of the model after the input information is input to the model based on state information indicating a state of the model after the input of the input information to the model using the selected at least one basis generation algorithm; and controlling the operation of the moving body based on the basis information.

20. An information processing device that performs an action using a machine learning model, the information processing device comprising:

a sensor;

a memory including a plurality of different basis generation algorithms that each includes a process or set of rules and is configured to generate basis information of the action; and processing circuitry configured to select, during the action, at least one basis generation algorithm of the plurality of different basis generation algorithms including selecting, during the action, a first basis generation algorithm of the plurality of different basis generation algorithms when one of (i) a real-time property is required, (ii) a locally approximated basis is desired, and (iii) a directionality of activating a concept is to be taken into account, and selecting, during the action, a second basis generation algorithm of the plurality of different basis generation algorithms different from the first basis generation algorithm when another of (i) the real-time property is required, (ii) the locally approximated basis is desired, and (iii) the directionality of activating a concept is to be taken into account;

output information indicating a basis of the action based on the basis information generated based on the at least one selected basis generation algorithm of the plurality of different basis generation algorithms and sensor information; and cause the information processing device to stop the action based on the basis information.

* * * * *